July 1, 1958
H. H. MUELLER
2,841,400
TONE ARM CONTROL FOR THE FULLY AUTOMATIC OR
MANUALLY CONTROLLED PLAYING OF
INTERMIXED RECORDS
Filed July 10, 1953
11 Sheets-Sheet 1
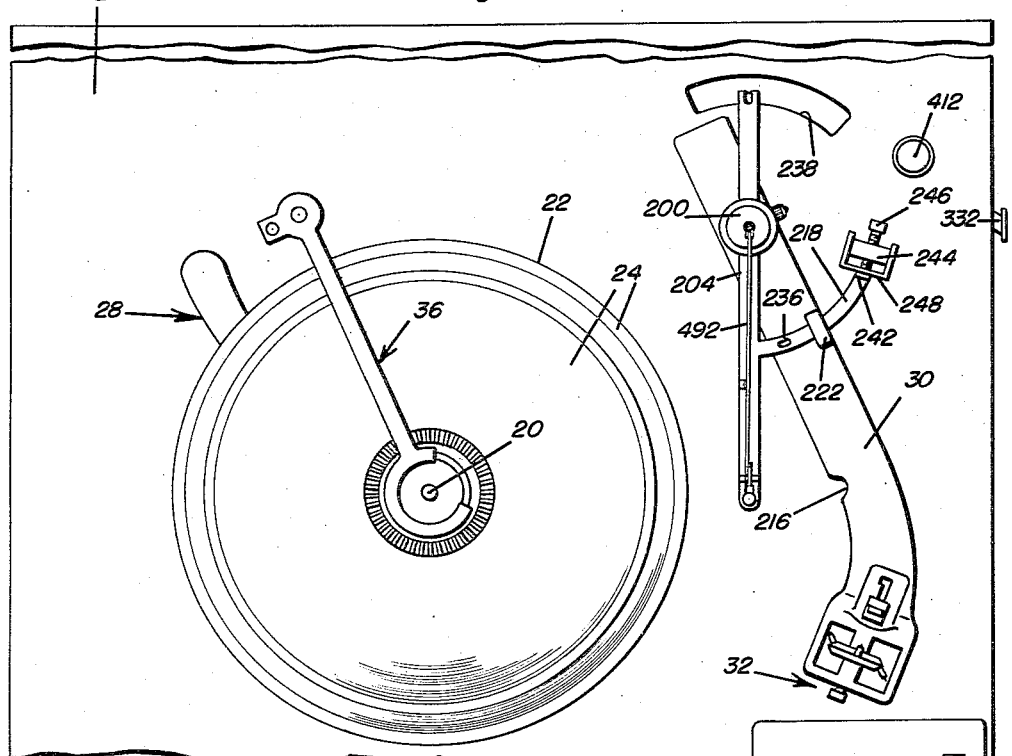
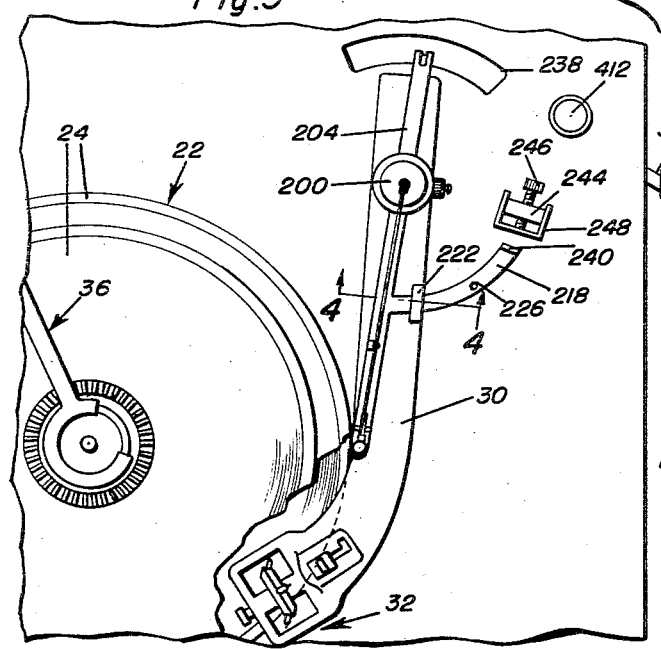
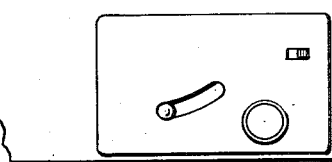
Herman H. Mueller
INVENTOR.
BY July 1, 1958  H. H. MUELLER  2,841,400
TONE ARM CONTROL FOR THE FULLY AUTOMATIC OR
MANUALLY CONTROLLED PLAYING OF
INTERMIXED RECORDS
Filed July 10, 1953  11 Sheets-Sheet 2
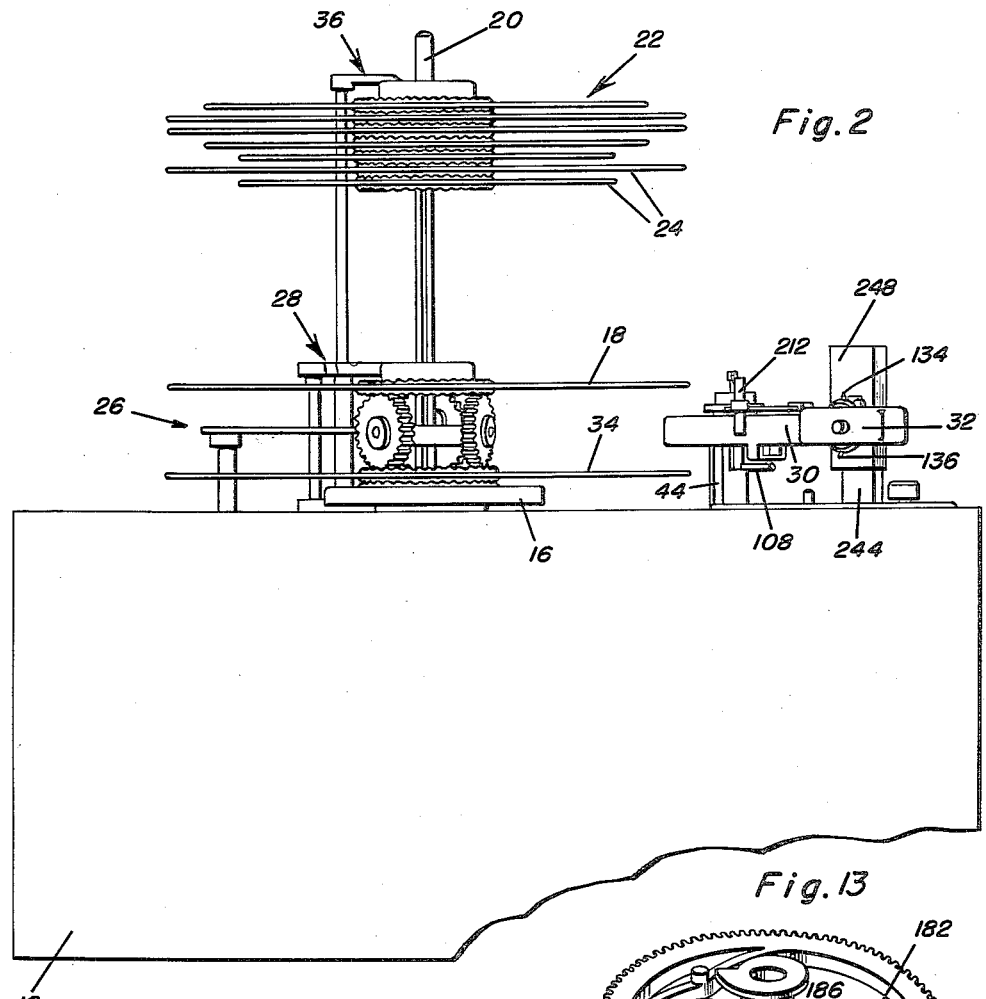
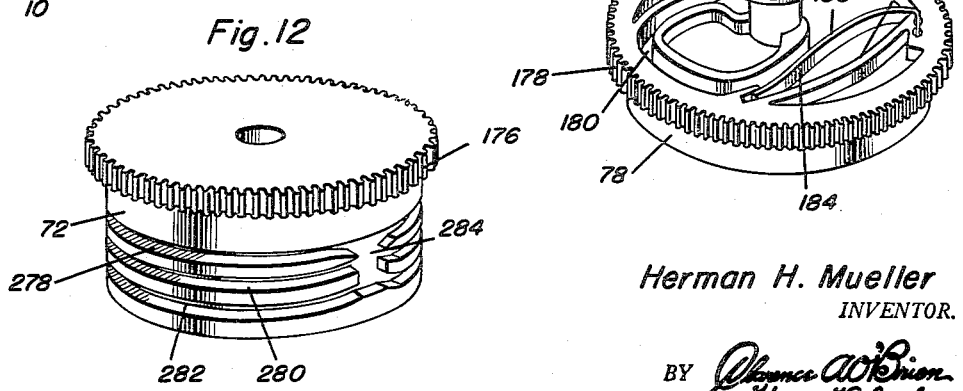
Herman H. Mueller
INVENTOR.
BY
Attorneys

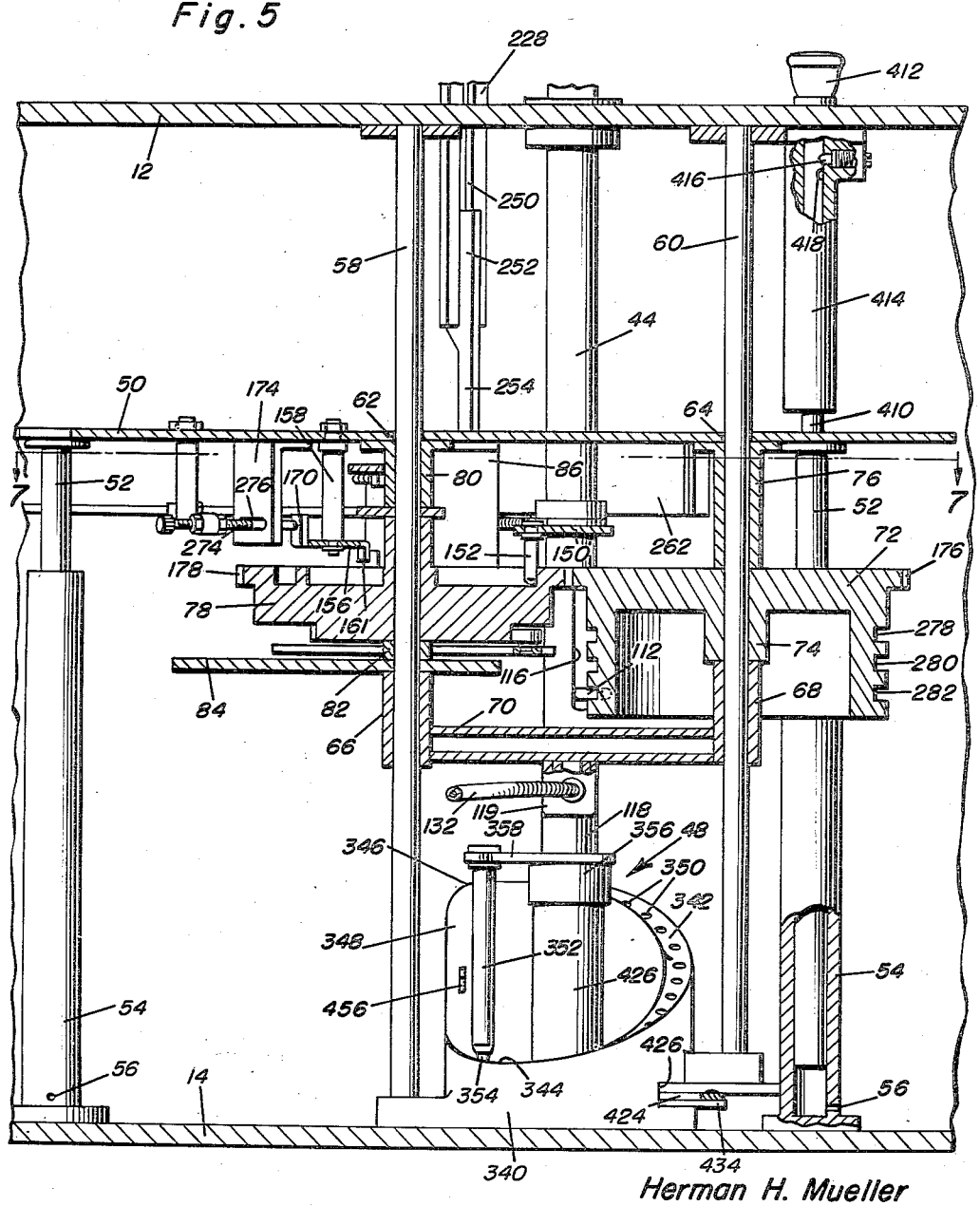

Herman H. Mueller
INVENTOR.

July 1, 1958

H. H. MUELLER 2,841,400

TONE ARM CONTROL FOR THE FULLY AUTOMATIC OR
MANUALLY CONTROLLED PLAYING OF
INTERMIXED RECORDS

Filed July 10, 1953

Herman H. Mueller
INVENTOR.

BY
Attorneys

Herman H. Mueller
INVENTOR.

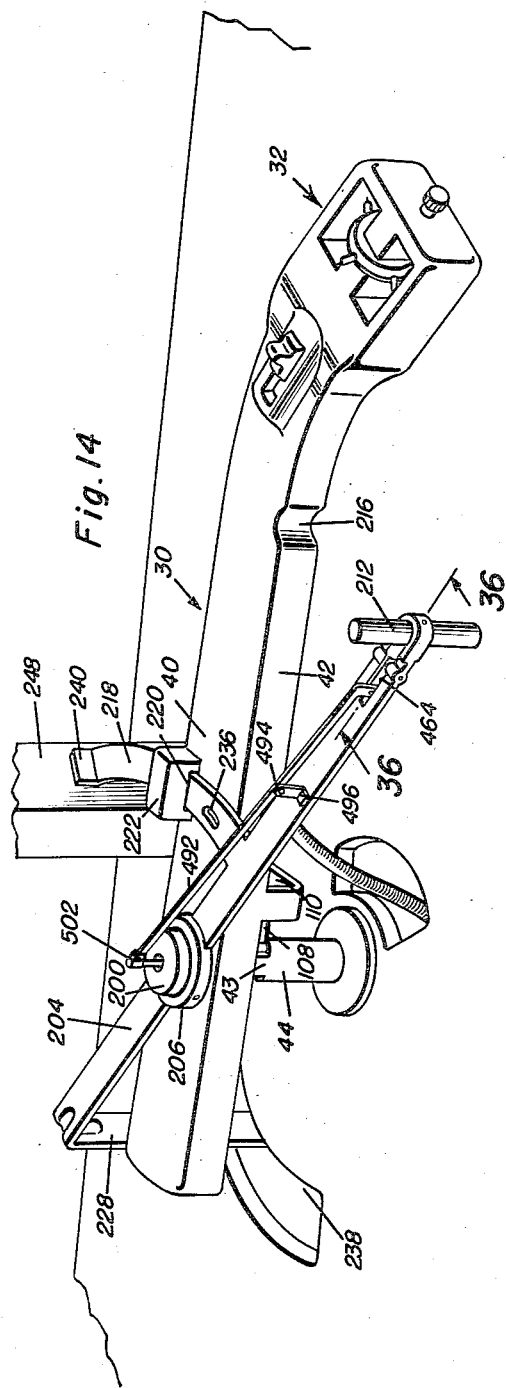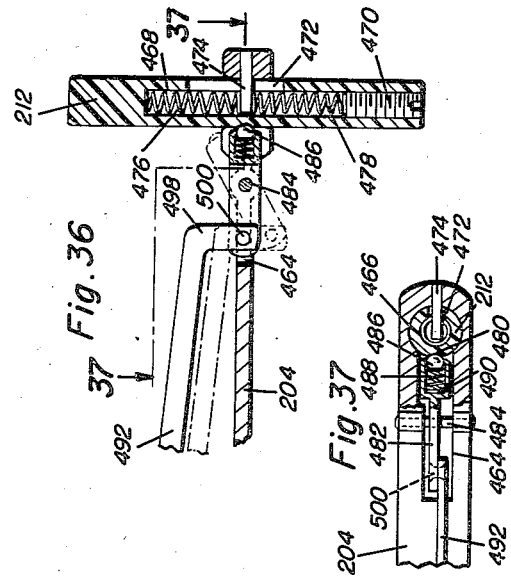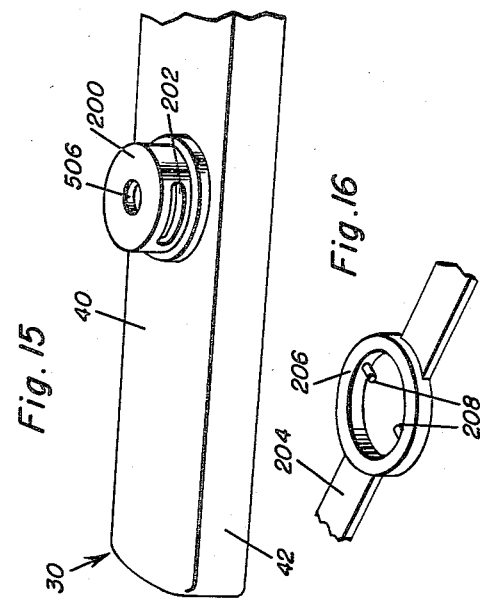

July 1, 1958
H. H. MUELLER
2,841,400
TONE ARM CONTROL FOR THE FULLY AUTOMATIC OR
MANUALLY CONTROLLED PLAYING OF
INTERMIXED RECORDS
Filed July 10, 1953
11 Sheets-Sheet 8
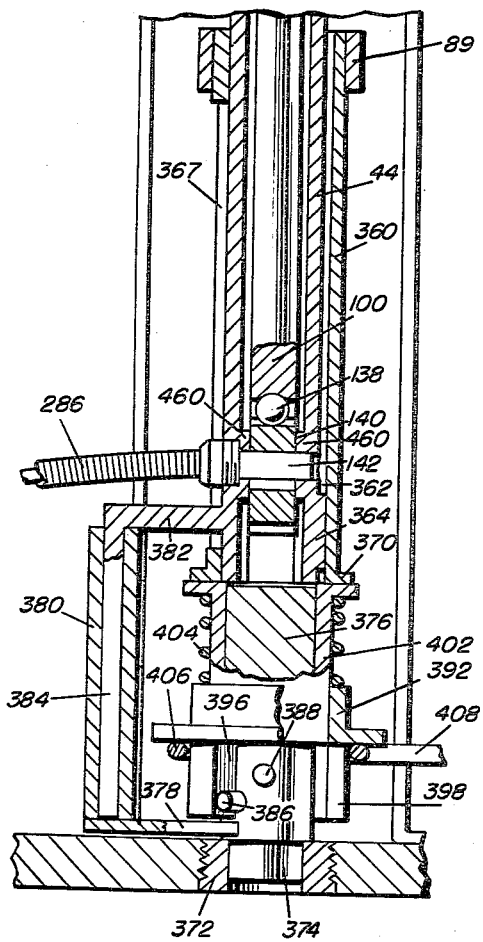
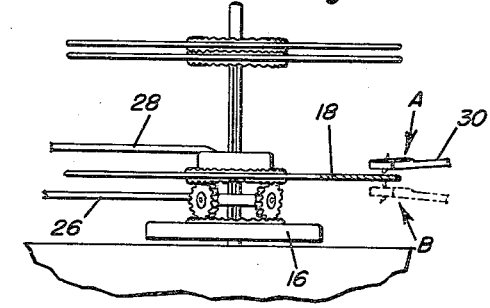
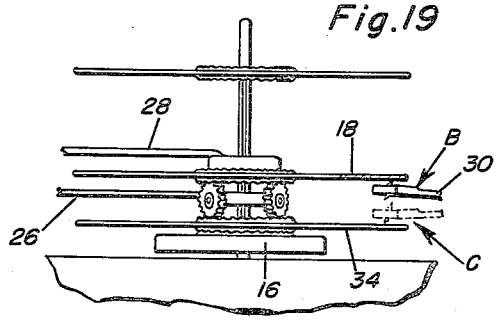
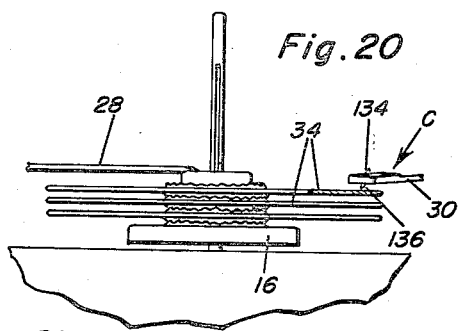
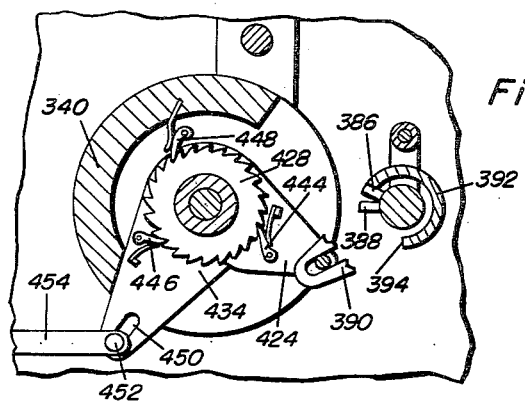
Herman H. Mueller
INVENTOR.
BY *Lawrence A. O'Brien*
and *Harvey B. Jackson*
Attorneys July 1, 1958

H. H. MUELLER 2,841,400

TONE ARM CONTROL FOR THE FULLY AUTOMATIC OR
MANUALLY CONTROLLED PLAYING OF
INTERMIXED RECORDS

Filed July 10, 1953

Herman H. Mueller
INVENTOR.

BY *Clarence A. O'Brien*
*and Harvey B. Jackson*
Attorneys

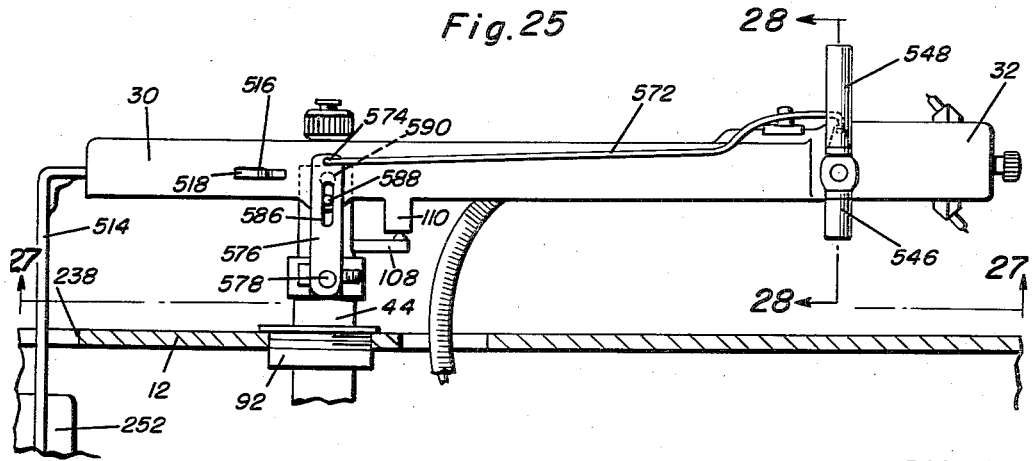

July 1, 1958
H. H. MUELLER
2,841,400
TONE ARM CONTROL FOR THE FULLY AUTOMATIC OR
MANUALLY CONTROLLED PLAYING OF
INTERMIXED RECORDS
Filed July 10, 1953
11 Sheets-Sheet 11
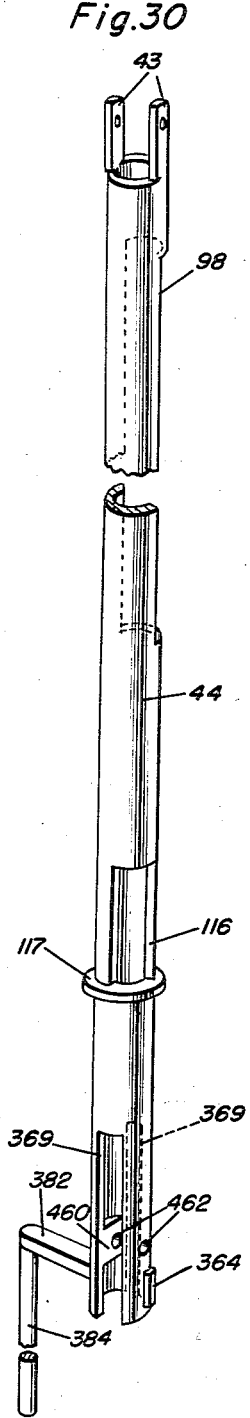
Fig.30
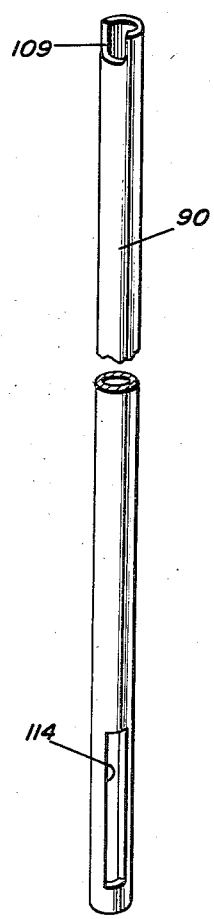
Fig.31
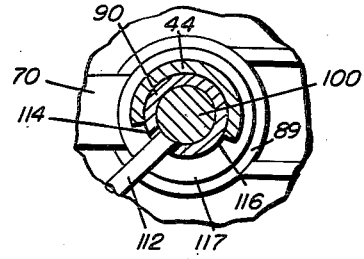
Fig.34
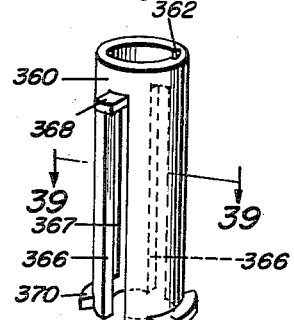
Fig.32
Fig.39
Fig.33
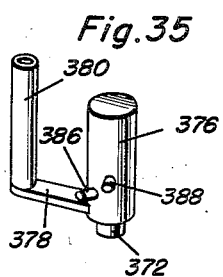
Fig.35
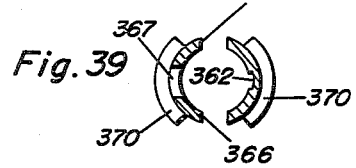
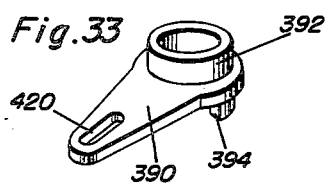
Herman H. Mueller
INVENTOR.
BY Clarence A O'Brien
and Harvey B. Jacobson
Attorneys

United States Patent Office 2,841,400
Patented July 1, 1958

2,841,400

TONE ARM CONTROL FOR THE FULLY AUTOMATIC OR MANUALLY CONTROLLED PLAYING OF INTERMIXED RECORDS

Herman H. Mueller, Ephrata, Pa., assignor of small interests to various assignees Application July 10, 1953, Serial No. 367,316

22 Claims. (Cl. 274—10)

This invention comprises novel and useful improvements in a tone arm control for playing intermixed records of various standard sizes and speeds of rotation, and more specifically relates to a tone arm having improved means for vertically positioning the tone arm and has associated therewith an indexing means for gauging or detecting the size of a record in an intermixed stack containing records of several different sizes, and in response to such detection properly positioning the tone arm at the beginning of the sound track for playing that record, and all in a fully automatic manner and selectively in one of a variety of sequences of automatic playing.

The primary object of this invention is to provide a tone arm control mechanism whereby the tone arm will be properly and automatically positioned for playing, in turn, each record of an intermixed stack containing two or more different sizes of records.

Another object of this invention is to provide a mechanism for selectively positioning or indexing a tone arm at the beginning of a record sound track to play the bottom and top sides of each record of a stack of intermixed records in a continuous sequence; or to play either the top sides or bottom sides only of a stack of intermixed records in sequence; or to play manually the top sides only or the bottom sides only of a stack of intermixed records in sequence while supporting and driving the record being played above or selectively upon a turntable; or to play manually and singly on the turntable, records of different sizes.

Specific primary objects of this invention are to provide improvements in each of the horizontal movements, for imparting controlled and timed horizontal swinging motions to the tone arm, in the vertical movement for imparting controlled and timed vertical travel to the tone arm in order to compensate the vertical position of the same with respect to the stack of records accumulating upon the turntable, or to properly position the tone arm for different manners of automatic playing; and in the tilting movement for effecting controlled and timed vertical pivoting motion of the tone arm for selectively playing the top or bottom sides or both of records in sequence.

A further object of the invention is to provide a tone arm control mechanism in accordance with the preceding objects which shall be specifically adapted for use in the dual phonograph record player of the type set forth in my prior co-epending applications Serial Numbers 98,048, now Patent No. 2,729,455; 296,558; 296,382; 314,987; 347,507; 318,365; and 359,082.

Another important object of this invention is to modify the horizontal movement of a record player whereby the latter may be rendered capable of playing automatically three or more sizes of records.

A further specific object of the invention is to provide a tone arm control mechanism having associated therewith an indexing mechanism comprising a gauging and indexing device which shall detect and respond to records of different sizes in an intermixed stack of records and control the horizontal movement of the tone arm and index the same in accordance therewith, and wherein the gauging device is automatically retracted into a non-gauging position upon the tone arm except during the gauging operation.

Another specific object is to provide a positive mechanical connection for tilting the tone arm to play the upper and lower sound tracks of records.

An additional object is to provide a construction wherein the tone arm is tilted at a constant angle of declination or inclination in the playing of records, which angle shall not be effected by the manner in which records are automatically played, nor by the number of records accumulating upon the turntable.

Yet another object is to provide a mercury weight assembly which shall facilitate the completion of the tilting of the tone arm over the same as has been initiated, and which will effect a constant light but adjustable pressure of the needle against the sound tracks in either tilted position, to thereby minimize wear on the sound track and stylus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top plan view of a phonograph record player including a tone arm incorporating therein a gauging and indexing device in accordance with this invention, the gauging device being shown in the position which it assumes after having been reset for the next gauging operation;

Figure 2 is a fragmentary side elevational view of a phonograph record player in accordance with Figure 1, the parts being in the position shown in Figure 1 and being positioned for the second of three manners of automatically playing records, as in Figure 19;

Figure 3 is a fragmentary view of a position of Figure 1 but showing the tone arm and the gauging device in the position which they assume upon the completion of the gauging operation, and after the horizontal movement has been adjusted thereby in accordance with the size of the record as determined by the gauging operation for indexing the tone arm;

Figure 4 is a detail view taken upon an enlarged scale in vertical transverse section substantially upon the plane indicated by the section line 4—4 of Figure 3 and showing certain structural features of the gauging device and its association with the tone arm;

Figure 5 is a fragmentary vertical transverse sectional view through the phonograph record player in accordance with this invention, being taken substantially upon the plane indicated by the section line 5—5 of Figure 7, parts being broken away and shown in section;

Figure 11 is a further horizontal sectional detail view taken substantially upon the plane indicated by the section line 11—11 of Figure 6 and upon an enlarged scale and shows certain elements of the automatic and manually operated control means for the tilting mechanism of the tone arm;

Figure 12 is a perspective view of the tilting movement cam of the device;

Figure 13 is a perspective view of the horizontal movement cam device;

Figure 14 is a perspective view of the tone arm assembly showing the gauging blade in position for a gauging and indexing operation;

Figure 15 is a fragmentary perspective view of a portion of the tone arm showing the means for pivotally mounting the gauging blade thereon;

Figure 16 is a fragmentary perspective view of a portion of the gauging blade of the tone arm, showing the pivot means whereby the same is secured to the tone arm;

Figure 17 is a fragmentary view partly in vertical section and partly in elevation of a portion of Figure 6 taken upon an enlarged scale substantially upon the plane of the section line 17—17 of Figure 8 and showing the manner in which the tone arm support post is operatively connected to the control means for the tilting mechanism and to the ratchet driving means of the compensating mechanism;

Figures 18–20 are diagrammatic views, corresponding respectively to Figures 9–11 of my copending application Serial Number 359,082, partly in elevation and partly in section and showing the different vertical and tilting positions of the tone arm for selectively playing records automatically in three different manners;

Figure 21 is a horizontal sectional detail view taken substantially upon the plane indicated by the section line 21—21 of Figure 8 and showing certain details of the adjustable driving connection between the tone arm support post and the ratchet mechanism of the compensating mechanism;

Figure 25 is a vertical sectional detail view showing in elevation the tone arm and a modified form of gauging device applied thereto;

Figure 26 is a perspective view of an element of the gauging device of Figure 25;

Figure 27 is a horizontal sectional view taken substantially upon the plane indicated by the section line 27—27 of Figure 25 and looking upwardly at the bottom of the tone arm and its gauging device;

Figure 28 is a vertical transverse sectional detail taken upon an enlarged scale substantially upon the plane indicated by the section line 28—28 of Figure 25 and showing the mounting of the modified gauging device;

Figure 30 is a perspective view, parts being broken away, of the tone arm support post;

Figure 31 is a perspective view, parts being broken away, of a stationary guide sleeve upon which the support post is rotatably and slidably mounted;

Figure 32 is a perspective view of the actuating sleeve which connects the tone arm support post to the ratchet drive means for the compensating mechanism;

Figure 33 is a perspective view of a crank arm forming a part of the ratchet drive means of the compensating mechanism;

Figure 34 is a detail view taken in horizontal section substantially upon the plane indicated by the section line 34—34 of Figure 6;

Figure 35 is a perspective view of a connecting member for the tone arm support post and the ratcheting device of the compensating mechanism;

Figure 36 is a detail view taken in vertical section substantially upon the plane indicated by the section line 36—36 of Figure 14, and showing structural details of the gauging roller and its mounting;

Figure 37 is a detail view taken in horizontal section substantially upon the plane indicated by the broken section line 37—37 of Figure 36;

Figure 39 is a horizontal sectional view taken substantially upon the plane indicated by the section line 39—39 of Figure 32 and showing certain structural features of the driving sleeve forming an element of the connection between the tone arm support post and the ratchet drive of the compensating mechanism.

Figure 6:
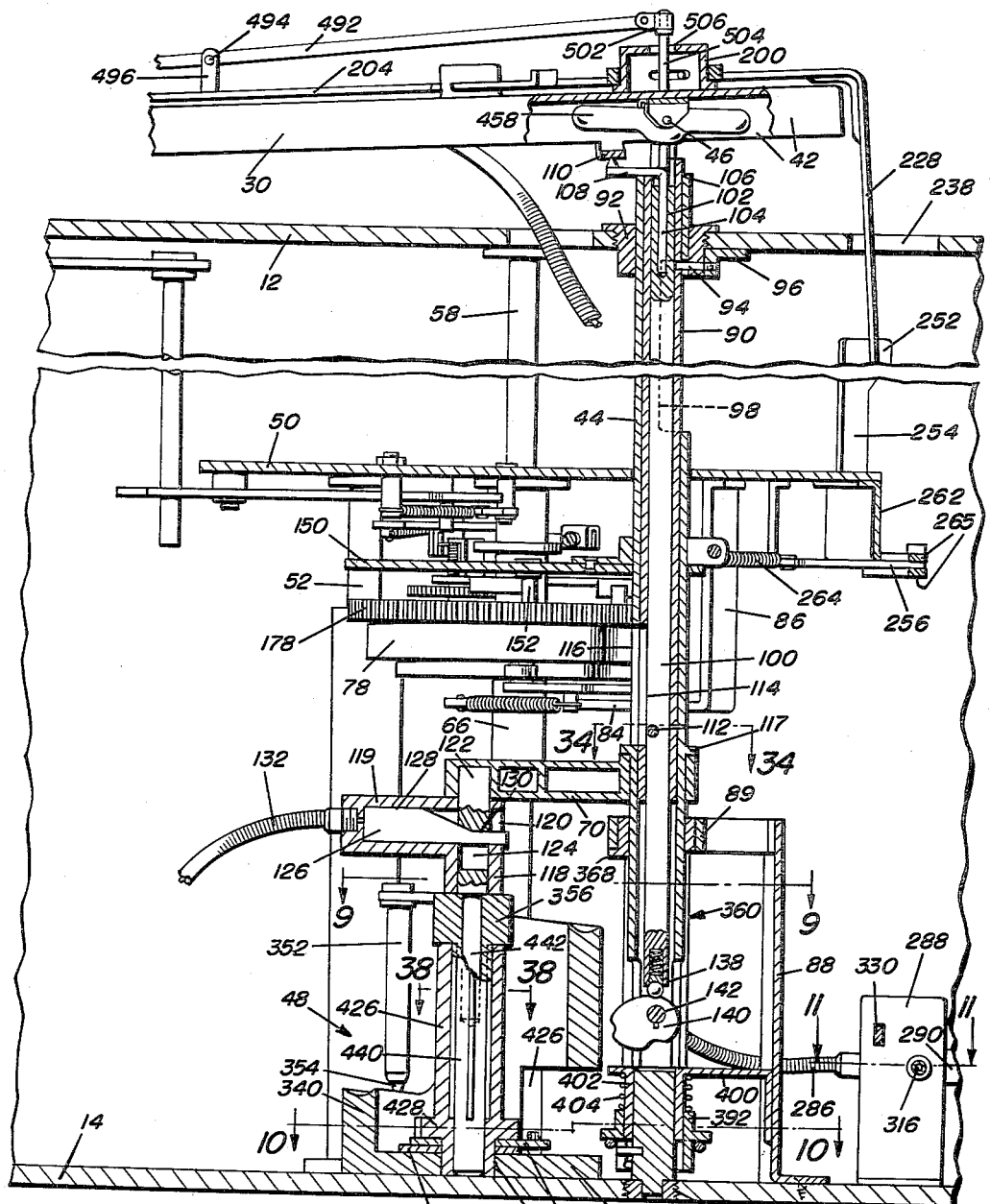
Figure 6 is a vertical transverse sectional view taken substantially upon the plane indicated by the section line 6—6 of Figure 7, parts being broken away and shown in section, this view being taken substantially at right angles to that of Figure 5, and showing the tone arm in its normal vertical position and tilted downward for playing the top side of a record carried by the turntable.

The novel tone arm control and gauging mechanism set forth and claimed hereinafter has been illustrated in the accompanying drawings as applied to a dual phonograph record player of the type set forth in my prior co-pending application Serial No. 347,507, filed April 8, 1953, and for automatic speed and needle changer control for playing interlocking records. It will be appreciated, however, that although the control mechanism and gauging device have been shown as applied to this particular type of phonograph record player, that the principles of the invention are not limited thereto but may be practiced with a variety of different constructions of phonograph record players as will be more readily apparent.

Automatic record players of the type with which the present invention is primarily concerned have a movement for imparting horizontal swinging motion to the tone arm for moving the tone arm between a rest position at one side of the record and a playing position upon the record, for causing the tone arm to actuate the associated record changer mechanism of the record player, upon completion of the playing of a record; a movement for imparting vertical movement to the tone arm; and in some instances, a movement for imparting tilting motion to the tone arm. These movements are operated in timed relation to each other to enable the tone arm to perform its various motions and functions during its operation. The present invention disclosed and claimed hereinafter relates to improvements in each of these three movements.

General Organization

The automatic record player and changer illustrated in the accompanying drawings is of the dual record type, and includes a cabinet or casing 10 having top and bottom walls 12 and 14. Rotatably mounted upon the top of the cabinet is a turntable 16 which may be of any suitable construction and mounting, and is driven in any desired manner from a uni-directional constant speed motor, not shown, as disclosed for example, in my co-pending applications: Serial Nos. 98,048; 296,382; 314,987; and in my prior Patent No. 2,559,786.

There is further illustrated a stationary spindle 20 having means for supporting a stack 22 of intermixed records 24 of different sizes to be released successively in any desired manner from the stack for playing. These records are preferably of the interlocking non-slipping type disclosed in the above mentioned applications and patent. A record supporting and driving assembly 26 is shown in Figure 2 and this is preferably of the type disclosed in my co-pending applications Serial Nos. 98,048; 296,382; 384,987; 347,507; 318,365. The assembly 26 serves to support a record 18 above the turntable and to drive the record from the turntable but in the opposite direction of rotation to permit the tone arm to play the underside of the record.

The pressure arm assembly 28 is employed to maintain the record 18 being played in firm non-slipping contact with the means 26, the turntable 16 or the records 34 carried by the turntable, and may be of the character disclosed in my co-pending applications Serial Nos. 98,048; 314,987; 347,507.

A tone arm 30 is also provided with a record gauging or indexing device, as set forth hereinafter, and may include the features set forth and claimed in my co-pending applications Serial Nos. 296,558; 347,507. In particular, the tone arm 30 includes a needle changer assembly 32 of the construction claimed in Serial No. 347,507, and a tone arm support post of a particular construction to be set forth hereinafter; or in some instances which may be of the same or of a similar construction to that shown in Serial No. 296,558.

Also, illustrated in the drawings, is a stack weight assembly 36 which may be of the construction and operation disclosed in application Serial No. 347,507.

Both the vertical and horizontal movements actuate the tone arm by an operative connection with the tone arm support post. In addition, to these movements, there is a further mechanism or movement for selectively tilting the tone arm upwards or downwards upon its support, when the tone arm is positioned between the records 18 and 34, whereby to position the needle assembly in playing position upon either the top sound track or the sound track on the under surface of a record 18 mounted upon the supporting and driving assembly 26 or the sound track on the upper surface of a record 34 resting upon the turntable or the stack of records accumulated upon the turntable; or above the record 18 when playing the top surface of a record positioned upon the supporting and driving assembly 26. This mechanism or movement is known as the tilting movement.

The horizontal, vertical and tilting movements are operated by the motor, not shown, in proper correlation to each other and to the other movements of the record player by the mechanisms or movements to be described fully hereinafter.

The tone arm assembly includes a gauging or indexing device, two forms being illustrated and described hereinafter, which detect the size of a record to be played and then adjust the horizontal movement accordingly so that the tone arm will be indexed or set down upon the sound track of the record at the proper point despite variations in the size of successive records. These gauging devices are likewise described fully hereinafter.

Tone arm mounting and support

A novel mounting and support structure is provided for the tone arm whereby the latter may be reciprocated vertically under the control of the vertical movement; may be tilted about a horizontal axis under the control of the tilting movement; and may be rotated horizontally about a vertical axis by the horizontal movement.

As seen best in Figures 4, 6, and 14, the tone arm 30 has a flat top wall 40, a pair of flat parallel side walls 42 and an open bottom, being pivoted for vertical tilting to the furcations 43 on the upper end of a vertically extending tubular support post 44, see Figure 30, by horizontal trunnions or pins 46. As set forth hereinafter, the support post is caused to move vertically by the vertical movement and to rotate or oscillate about its vertical axis by the horizontal movement, carrying with it the tone arm which is also capable of an independent vertical tilting about the horizontal axis of the pins 46.

By a compensating mechanism 48, to be hereinafter more fully described, and different forms of which are set forth in detail in my prior applications Serial Nos. 296,558; 359,082; the support post and tone arm are automatically vertically elevated step-by-step, each time a record is played and changed in order to compensate the vertical position of the tone arm for the accumulating stack of records upon the turntable whereby the tone arm and its stylus will always be at the same relative vertical position with respect to a record being played thereby. The construction and operation and improved form of this compensating mechanism and its driving means are set forth in detail hereinafter.

Figure 7:
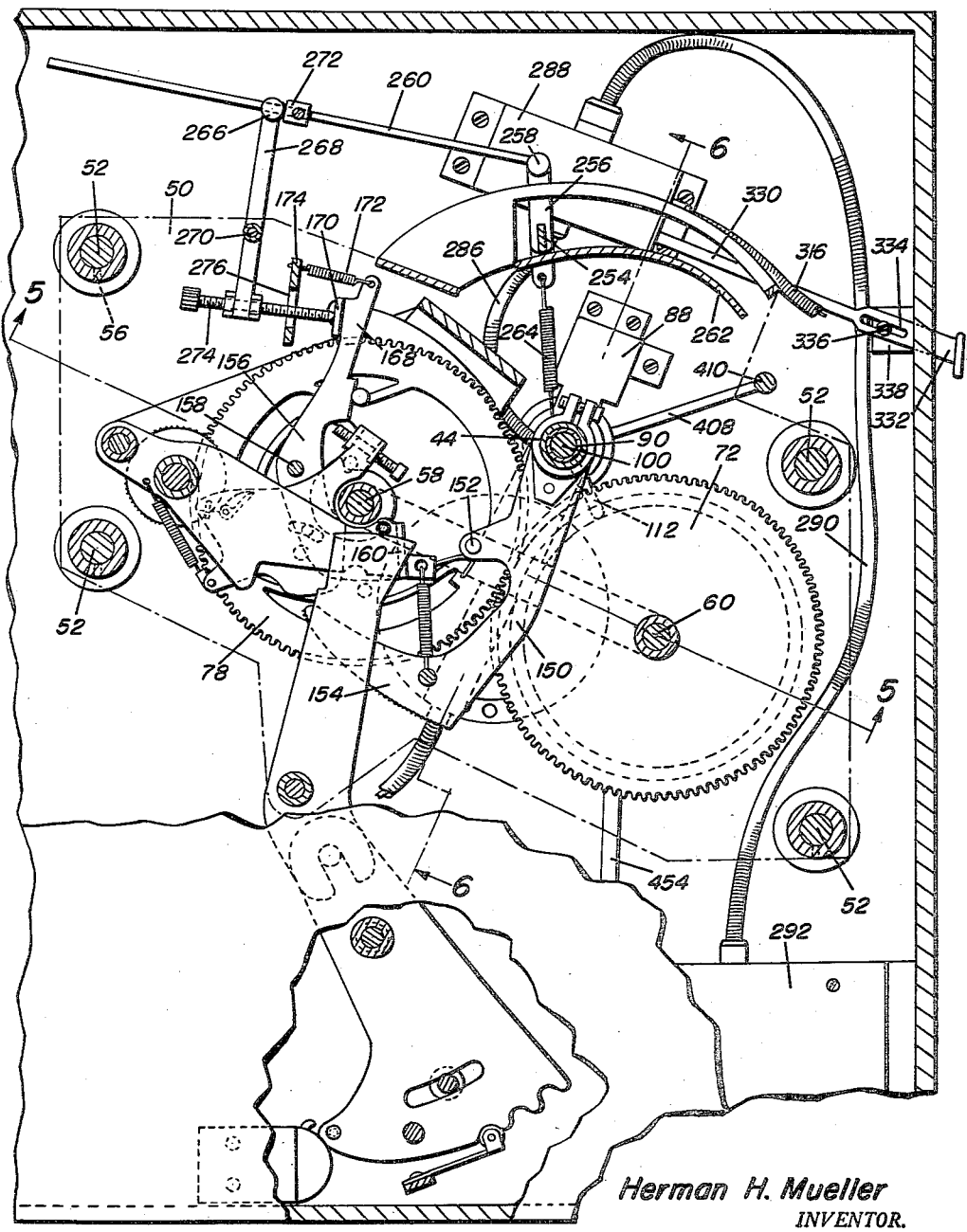
Figure 7 is a fragmentary horizontal sectional view taken substantially upon the plane indicated by the section line 7—7 of Figure 5 and looking downwardly upon the tilting, horizontal and vertical movements of the invention.

A horizontal disposed platform 50, see Figures 5–7, is guidingly disposed within the cabinet 10 for vertical movement by any suitable number of supporting rods 52, secured to the underside of the platform, four such rods being shown in Figure 7. These rods have their lower ends slidable within stationary support cylinders 54 mounted upon the base 14 and provided with air vent passages 56 to prevent a dash pot effect. The lower ends of the support rods 52 comprise plungers or pistons slidable in the support cylinders, or may be provided with plunger or pistons.

Secured within the cabinet, as by being fastened to the top and bottom walls thereof, are a pair of stationary guide rods 58 and 60. The platform 50 has suitable apertures 62 and 64 by which it is slidable upon the guide rods. By means of bushings or tubular members 66 and 68, at its opposite ends, a cross head 70 is mounted for vertical sliding movement upon the guide rods.

A tilting movement cam 72, see Figure 12, which directly controls the vertical movement of the tone arm, is freely rotatably and vertically slidable upon the guide rod 60 by means of a hub 74. The hub rests directly upon the upper end of the bushing 68, while a spacer and supporting sleeve 76 is slidable upon the rod 60 and abuts the cam 72 and the platform 50.

A horizontal movement cam 78, see Figure 13, which directly controls the horizontal swinging movement of the tone arm, is likewise freely rotatable and slidable vertically upon the rod 58, suitable spacer and support sleeves 80 and 82 being provided upon the rod 58 between the cam 78 and the bushing 66 and the platform 50. A horizontal bracket 84, see also Figure 6, is journaled upon the rod 58 and has a vertical arm 86 secured to the platform 50 and serves to further brace and rigidify the members 50 and 70.

By the foregoing construction, vertical movement of the cross head 70 will result in corresponding vertical travel of the platform 50 which is fixedly positioned relative to the cross head and is carried thereby.

Mounted upon the bottom wall 14, is a stationary standard 88 having a journal bearing 89 in its upper end which guidingly and slidingly receives the support post 44. The latter is rotatably and slidably received upon a stationary vertical sleeve 90, see Figure 31. At their upper ends, see Figure 6, the sleeve 90 and the support post 44 extend through the top wall 12 being journaled therein by the bushing 92. A set screw or locking pin 94 carried by a bracket or lug 96 mounted on the top wall 12 extends through a slot 98 in the support post 44 and engages and secures the sleeve 90 whose lower end terminates adjacent the bearing 89. As shown in dotted lines in Figure 6, and in Figure 31, the slot 98 extends a suitable distance both axially and circumferentially of the support post 44 to allow the necessary vertical and horizontal oscillatory motion required for the vertical and horizontal swinging movement of the tone arm.

Vertically slidable within the sleeve 90 is the tone arm tilting rod 100, having an axial bore 102 in its upper end which receives the vertical leg 104 of a tilting pin 106 having a horizontal leg 108. The latter extends through and rides in a circumferentially extending vertical notch or slot 109 in the upper end of the member 90 and between the support post furcations 43 whereby the tilting pin has vertical motion with the tilting rod and support post but is restrained against rotation relative to the tone arm and its support post. For this purpose the slot 109 in the stationary sleeve 90 is of sufficient circumferential extent to allow the leg 108 to swing horizontally with the tone arm and support post as well as to move axially thereof upon vertical movement of the tilting rod 100. The horizontal leg 108 engages a seat or indentation upon the underside of a bracket 110, see also Figures 4 and 14, secured to and extending below the tone arm side walls 42, whereby the tone arm may be vertically tilted upon its supporting pins 46 by which it is pivoted to the support post 44, upon vertical movement of the tilting rod 100.

Intermediate its ends, the tilting rod 100 has a lateral actuating pin 112, see also Figure 34, which is engaged with the vertical movement cam 72 in a manner to be subsequently set forth. This pin 112 is guided in a narrow vertical slot 114, in the stationary sleeve 90 and extends through an elongated and widened slot 116 in the axially and oscillatably movable support post 44, this last mentioned slot 116 possessing another function as set forth hereinafter.

At its lower end, the support post has an arcuate or circumferentially extending rib or shoulder 117 which rests upon and is secured to and carried by the cross head 70 for vertical movement herewith.

Reference is next made to the diagrammatic views of Figures 18–20, which disclose the different vertically adjusted positions of the tone arm during the automatic or manual operation of the record player.

Figure 8:
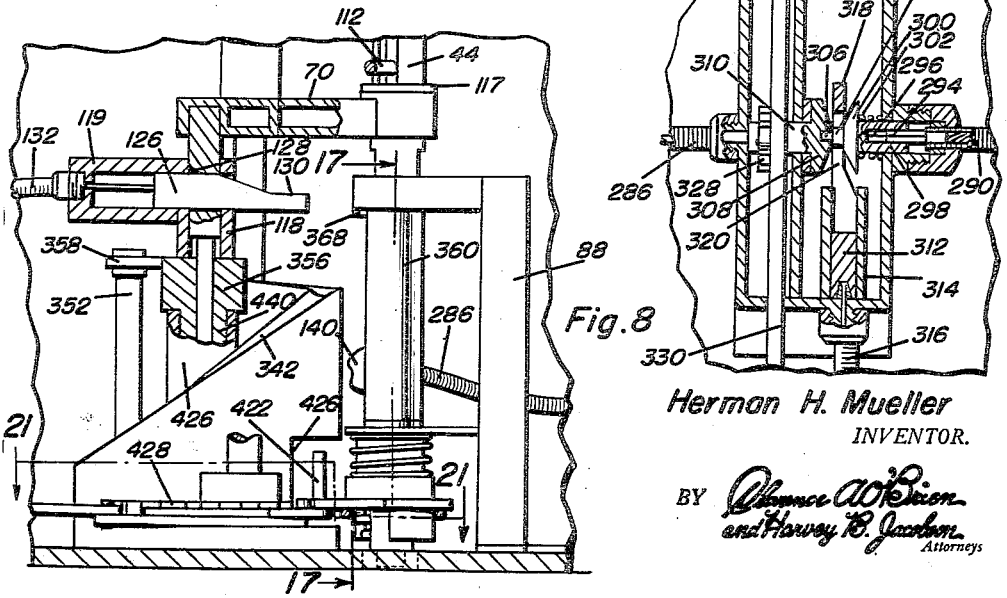
Figure 8 is a detail view upon a slightly enlarged scale of a portion of Figure 6 but showing certain of the parts of the manual and automatic control of the vertical movement in a different position of adjustment to elevate the tone arm above its normal vertical position for playing the top sides of records carried by the supporting and driving assembly.

Figure 18 shows the position assumed by the tone arm when it is desired to automatically play the top and bottom sides of a record 18, while the latter is supported upon and driven by the supporting and driving assembly 26. The tone arm is first elevated to the position A of Figure 18, above the record supported by the assembly 26, by interposing the cam upper surface 128 beneath the top edge of the plunger slot 124, as shown in Figure 8. The tone arm is then tilted downwardly to play the sound groove upon the top side of the record. After the top side of the record has been played in this manner, the cam wedge 126 is withdrawn until the lower cam surface 130 is positioned in the cam slot 124, as shown in Figure 6, thereby vertically lowering the tone arm from the position A to the position B of Figure 18. The tone arm is then tilted upward to play the sound track on the underside of the record.

Figure 19 shows the tone arm position when the sound track upon the underside of a record is to be played when the record 18 is supported upon the assembly 26 and the sound groove upon the top side of the records to be played when that record is supported, as at 34, upon the top of the turntable 16 or the stack of records placed thereon. In the position of Figure 19, the tone arm remains in the same vertically adjusted position as that described above in connection with position B of Figure 18, this being the position in which, as shown in Figure 6, the lower cam surface 130 is engaged with the upper edge of the slot 124 in the plunger. In the position of Figure 19, the tone arm is tilted upwardly to the position shown at B, this being identical with the position B of Figure 18, to play the underside of the record carried by the supporting and driving assembly 26. Thereafter, the tone arm is tilted downwardly to the position shown at C whereupon the top side of the record 18, after the latter has been lowered to the turntable in the position of the record 34, is then played.

Figure 20 shows the position of the tone arm when it is desired to play records in a conventional manner, by successively dropping the records from a stack mounted upon the spindle to the turntable, and playing the top side of the record only when the latter rest upon the turntable. In this mode of operation, corresponding to the conventional operation of the well known record player, the supporting and driving assembly and the pressure head assembly 26 and 28, respectively, are withdrawn to one side of the turntable of the record player and remain idle. In this manner of playing records automatically, the tone arm is positioned at the same vertical position as employed in the playing of records in the manner indicated in Figure 19, this being the position in which the lower cam surface 130 is disposed at the upper end of the slot 124 in the plunger. In this position, the tone arm is positioned downwardly to the position shown in Figure 20, this being the same position C seen in Figure 19, and the top side of the record is played.

In summary, from the foregoing three manners of automatically playing records, it will be seen that the tone arm is positioned vertically at the same position, as shown in Figure 6, for the playing of either top or bottom sides of records except when the top side of the record is played as the latter is supported upon the supporting and driving rollers as in Figure 18, the tone arm then being in the elevated vertical position indicated at A.

During the above mentioned automatic playing of records, in the manner indicated in Figures 18 and 19, it is understood that the supporting and driving assembly 26 and the pressure arm assembly 28 are operated automatically and in timed relation to the operation of the other elements of the automatic record player. In addition, the pressure arm assembly serves to maintain the record 18 in firm contact with the supporting and driving assembly to prevent any possible slippage between the turntable, records stacked thereon, the supporting and driving assembly rollers and the record 18 carried thereby.

In addition to the automatic playing of records in accordance with the manners indicated in Figures 18–20, it is also possible to manually play records with this apparatus. For that purpose, the records are individually placed manually upon the turntable, with the tone arm placed in its normal vertical position, as shown in Figure 6, and the tone arm is then applied and withdrawn from the record manually, as suggested in Figure 20.

In order to place the tone arm in the position A of Figure 18, in order to play the top side of a record 18 mounted upon the supporting and driving assembly 26, it is necessary to vertically elevate the crosshead support post and tone arm relative to the compensating mechanism 48. For that purpose the following mechanism is provided.

Depending from the cross head 70 is a sleeve 118, see Figures 6 and 8 in particular, having a hollow lateral extension 118 and a longitudinal slot 120 diametrically alined with the opening from the sleeve into the hollow extension. The plunger 122 is slidable in the sleeve and has a longitudinal diametrical slot 124 alined with the sleeve slot 120. Slidable in the lateral extension 118 is a cam 126 having a pair of vertically and horizontally spaced upper and lower surfaces 128 and 130. The cam is slidably adjustable transversely of the sleeve and plunger by a flexible cable control assembly indicated generally by the numeral 132. When the cam is adjusted as shown in Figure 6, the lower surface 130 is interposed between the bottom edge of the slot 120 in the sleeve 116 and the top edge of the slot 124 in the plunger 122 whereby the cross head will be in its lowered position relative to the sleeve for lifting by the latter. This position of the tone arm is the normal playing position.

In this position of the wedge 126, the tone arm is positioned in the two playing positions B of Figure 18; or the positions B or C of Figure 19; or the position C of Figure 20, for the purposes and operation set forth in my co-pending application Serial No. 359,082; and as set forth hereinafter.

When the wedge 126 is actuated or shifted by the cable assembly 132 to cause the upper cam surface 128 to be positioned within the plunger slot 124, as in Figure 8, the plunger 122 and the cross head supported thereby will be elevated relative to the sleeve 116. Thus, the tone arm carried by its support post 44 will be temporarily lifted above its normal position. This is the position of Figure 9 of application Serial No. 359,082, and the position A of Figure 18 to play top side of records carried and driven by the supporting and driving assembly 26.

The wedge 126 is disposed as in Figure 8, only when the tone arm is to be elevated from the position B of Figure 18 to the position A therein, for playing the top side of a record supported upon the assembly 26.

The mechanism for operating the cable assembly 132 is synchronized with the various organizations and instrumentalities forming the automatic record player, and is fully disclosed and claimed in my co-pending application Serial Number 359,082, filed June 2, 1953, for Selective Record Lowering, Lifting, and Releasing Means for Automatic Interlocking and Conventional Record Players. A detailed explanation of this mechanism has therefore been omitted as being unnecessary to an understanding of the invention as disclosed and claimed herein.

Whenever the term neede is used in this specification, it is to be understood, and it is intended that the same is employed to include and comprehend styluses of all types, magnetic sound reproducing pick-ups, light ray pick-ups and all other means for reproducing tones from a sound recording.

*Tilting movement*

In a conventional form of automatic record player, the tone arm is tilted through a widely varied range of declination, depending upon the number of records accumulating upon the turntable. This varying declination is relied upon to allow for or compensate for the variation in elevation of the topmost record on the turntable during the operation of the record player. In such an apparatus, it will be apparent, each tilted or vertical angle of the tone arm and needle with the record being played will be varied as a record is added to or taken from the stack upon the turntable. Such variations in the amount of tilting of the tone arm will detrimentally effect the wear upon the sound groove of the record and upon the fidelity of tonal reproduction.

It is an essential feature of the apparatus of the present invention that a constant and unvarying amount of tilting or declination and inclination of the tone arm relative to the sound tracks on the upper or lower surfaces of records being played shall be obtained, even though the number of records and the elevation of the topmost record of a stack of records on the turntable may be widely varied. To secure this desideratum, the tone arm is atomatically vertically repositioned upon each playing of a record whereby the tone arm will be disposed at the same relative position with respect to the record to be next played, thus effecting the same amount of tilting, either upwardly or downwardly, when the tone arm needle sets down on a sound track, by a compensating mechanism.

The tilting movement of the tone arm is effected by vertically raising and lowering the tilting rod 100 within the tone arm support post 44 and the stationary sleeve 90 therein, this vertical movement of the tilting rod causing vertical adjustment of the tilting rod pin 106 whereby its horizontal leg 108, in contact with the bracket 110, carried by the tone arm 30 will cause vertical pivoting movement of the tone arm about its horizontal trunnions 46. It will be understood that the weight of the tone arm and its center of gravity are so disposed that the tone arm will normally be in its lowered position except when elevated or tilted upwardly by the tilting rod pin leg 108. If desired, a spring means could be employed to yieldingly urge the tone arm into its lowermost position.

The tilting rod 100 is positionable in three vertical positions, which result in placing the tone arm in a horizontal or idle position, when the tilting rod is at an intermediate vertical position; in any upwardly tilted position corresponding to the position B of Figures 18-20 when the tilting rod is in its raised uppermost vertical position to play the bottom side of a record; and in a downwardly tilted position, as in the positions C of Figures 19 and 20, and A of Figure 18 to play the topside of a record. These three vertical positions of the tilting rod 100 to cause the tone arm to be disposed selectively in the horizontal, the upwardly tilted and the downwardly tilted positions are obtained by travel of the tilting rod actuating pin 112 in an appropriate one of three vertically spaced circumferential cam grooves upon the tilting cam 72. The actuating pin 112 is positioned in the appropriate cam groove by a control means which selectively positions the pin in the proper vertically spaced groove. The control means is operative as desired, either manually or automatically by and in synchronization with the other instrumentalities of the record player.

As shown best in Figures 5 and 12, the tilting cam 72 carries upon its cylindrical surface three vertically spaced circumferentially extending cam grooves. These include an upper cam groove 278, an intermediate cam groove 280 and a lower cam groove 282. A vertical channel 284 communicates with and forms a transfer or connecting passage between the three grooves, whereby the actuating pin 112 may be vertically adjusted, as mentioned above, to cause the pin to register with a selected groove, and upon rotation of the cam 72, to travel in that groove. It is intended that the rotation of the cam 72 shall be so controlled that it will cease its rotation in such position that the pin 112 will register with the channel 284 in readiness for vertical travel of the pin relative to the circumferential grooves.

The upper cam groove is so contoured and proportioned that it will give a final upward tilting movement to the tone arm to cause the needle to set down in playing position upon the sound track on the bottom side of a record in the position B of Figures 18 and 19; and to stay in the upwardly tilted position until the record has been played. Thereafter, the pin 112 will pass off the end of the circumferential cam surface with the transfer channel 284, allowing the pin to lower from the groove 278 whereupon the tone arm and needle will be slightly lowered or tilted slightly downward out of contact with the sound groove.

The intermediate cam groove 280 has a cam or bearing surface of uniform vertical height whereby the pin 112, in its travel through the groove, will be held vertically stationary thereby holding the tone arm in a horizontal or idle position, as in Figure 2, at which time the needles are spaced equidistantly between the records 18 and 34. In this position, the tone arm may freely swing in and out of the records 18 and 34 without danger of touching the sound tracks thereof. It will also be observed that rotation of the cam 72, when the pin 112 is in the intermediate groove 280, will be ineffective to tilt the tone arm either upwardly or downwardly. The lower cam groove 282 is similar to the upper cam groove 280 but causes a final downward tilting of the tone arm to cause the needle to set down in playing position upon the top side of a record 18 or 34 in the positions A of Figure 18 or C of Figures 19 and 20.

The control means provided for manually or automatically adjusting the tilting rod 100 for registry with a selected cam groove, as shown in Figures 6, 8 and 12, comprises an anti-friction ball 138 journaled on the lower end of the rod and constituting a cam follower which is operatively engaged with a tilting control cam 140 mounted upon the control shaft 142. Any suitable means, such as a flexible cable 286 is operatively connected to the control shaft 142 for rotatably adjusting the latter, as set forth hereinafter.

Figure 24:
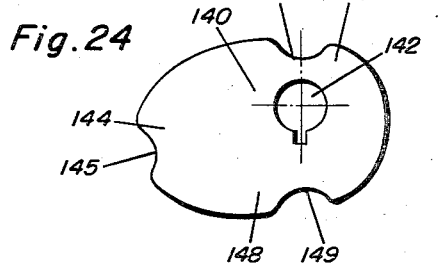
Figure 24 is a plan view of the automatically and manually operated control cam for the tilting movement.

Referring to Figure 24, it will be seen that the control cam has a high lift lobe 144, a low lift lobe 146 and an intermediate lift lobe 148. These lobes are recessed or notched, as at 145, 147, and 149, respectively, to form seats for the ball 138 when the latter rests on one of the control cam lobes. The lobes 144, 146, and 148, are of such lift as to vertically adjust the tilting rod 100 whereby its actuating pin 112 will move in the transfer channel 284 and will respectively register with the cam grooves 278, 280, and 282.

Attention is now directed to Figures 6, 7, and 11. The control cam actuating cable 286 is secured to a casing 288 in which it is detachably connected, in a manner to be subsequently set forth, to the end of further flexible cable actuating cable 290 which in turn enters a timer and synchronizer unit 292 of any suitable and conventional design which correlates the timing of the various instrumentalities and organizations of the record player. Since the construction and operation of the timer 292 forms no part of and is not essential to an understanding of the invention set forth and claimed herein, a further illustration or discussion of the same is deemed to be unnecessary.

As shown in Figure 11, the driving cable 290 has a splined end 294 which is slidably engaged in the splined socket 296 of a sleeve 298 having conical head 300. A compression spring 302 surrounds the sleeve 298 and yieldingly urges the latter inwardly of the casing 288. A stem 304 extends axially from the conical head, having a splined extremity 306. The latter is adapted for detachable slidable engagement in a complementary splined socket in the head 308 of a sleeve 310 which is in splined engagement with the control cable 286. The arrangement described above is such that when the sleeve 298 is allowed to move towards the sleeve 310 under the bias of the spring 302, the stem 304 has its splined extremity 306 in driving engagement with the splined socket of the sleeve 308, as in Figure 11. In this position, the control cable 286 is connected to the cable 290 for movement with the latter whereby rotation of the control cam 140 will be effected automatically and under the control of the timer unit 292.

Figure 29:
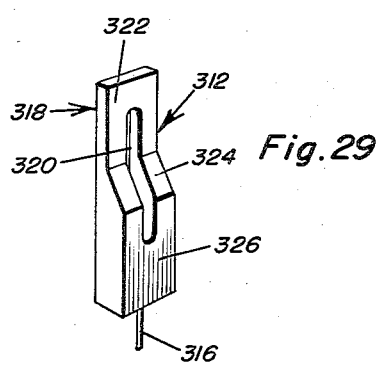
Figure 29 is a perspective view of a clutch actuator forming part of the control cam actuating mechanism.

Provision is made, however, for a release means to disengage the driving connection of the control cable 296 from the cable 290 whereby the former may be manually operated and controlled. This release means may conveniently consist of a plunger 312, slidable in a guide sleeve 314 under the influence of a manually operable actuator such as the flexible cable 316 which may be actuated from the cabinet exterior. The plunger, see Figure 29, has a nose portion 318 which is longitudinally slotted at 320 to slidably embrace the stem 304. The cam portion has a narrow portion 322 at its outer end which is connected by an inclined surface 324 to a relatively thickened portion 326 comprising a wedge. When the cable 316 is pushed, the plunger is moved towards the stem 304, placing the wedge 326 between the sleeves' heads 308 and 300, disengaging the spline 306 from the splined socket of the head 308 and breaking the driving engagement of the cables 290 and 286.

The manual control means comprises a pinion 328 on the sleeve 310 which is engageable by a rack bar 330 constituting a control rod, see also Figure 7, which extends exteriorily of the cabinet and is provided with a manual actuating knob 332. To guide the rack bar control rod, the latter has a longitudinal guide slot 334 which is slidably received upon a guide pin 336 mounted on a bracket or lug 338 on the cabinet wall. With the cable 290 disconnected by the wedge 326 from the cable 286, the latter may be rotated by the manual control rod 330 to vertically adjust the tilting rod 100 and its actuating pin 112 by the control cam 140.

It is desirable that the stylus shall rest upon the sound track of a record with a light and constant pressure in both the upward and downward tilted positions. Accordingly, the tone arm may be provided with a mercury weight 458, see Figure 6, which applies the same uniform weight to the stylus when the arm is tilted in either direction, as set forth in my pending application 296,558.

*Compensating mechanism*

The compensating mechanism 48 vertically elevates the tone arm support post each time a record is deposited upon the turntable, whereby the tone arm will be maintained at a fixed vertical position with respect to a record to be played, which is disposed at a fixed elevated distance above the varying stack of records on the turntable by the supporting and driving assembly 26. Connecting and operating means in the form of an adjustable ratchet drive or mechanism, are provided whereby the compensating mechanism is automatically actuated by the oscillation of the tone arm support post as the tone arm swings horizontally in and out during the playing of records. Provision is made for varying this automatic actuation and also to substitute therefor a manual actuation, when desired. For an understanding of the structure and functioning of the compensating mechanism 48, and the ratchet drive for the same, reference is made to Figures 5, 6, 8, 10, 17, 21, 30, 33, 35.

Secured to the base 14, see Figure 5, is a stationary cylindrical member or compensating cam 340 displaced from the vertical axis of the support post 44 and an inclined, upwardly spiraling cam surface 342 upon its upper edge which starts with a low point 344, rises uniformly to a high point 346 and has an abrupt drop 348 returning from the high to the low point. The cam surface 342 has a plurality of equidistant recesses 350 and its vertical height, between the points 344 and 346, is equal to the aggregate thickness of the maximum number or records intended to be stacked upon the turntable during operation of the record player. The number of the recesses 350 is therefore proportional to the amount of vertical compensating travel which it is desired to give to the tone arm support post, being either equal to or a multiple of the number of records which the record player can automatically handle.

A lifter assembly is associated with the compensating cam for actuation thereby. This consists of a follower 352, which may be of the construction shown and described in my copending application Serial Nos. 98,048; 296,558 and 314,987, has its depending extremity 354 adapted to seat in the recesses 350 as the follower travels along the inclined cam track 342. Extending laterally from a head 356 is a horizontal arm 358 having the follower 352 rigidly mounted thereon and depending therefrom.

Figure 9:
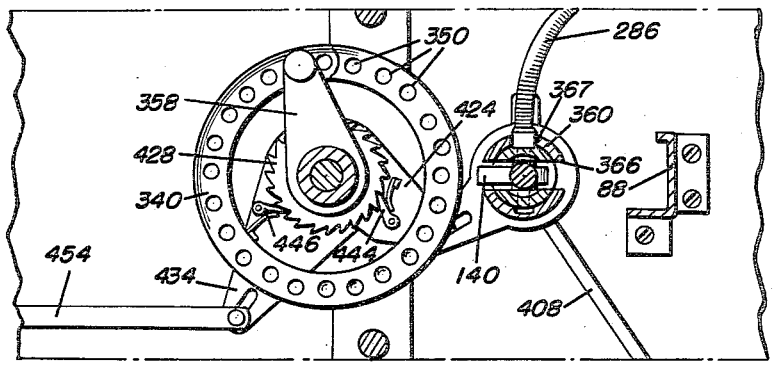
Figure 9 is a horizontal sectional detail view taken substantially upon the plane indicated by the section line 9—9 of Figure 6; and shows certain details of the compensating mechanism for vertically moving the tone arm and its support post assembly to calibrate its vertical position in accordance with the accumulation of records upon the turntable.

Referring especially to Figures 5, 6, 8, 10, 21, and 38, it will be seen that disposed centrally in the compensating cam 340 is a tubular shaft 426 having integrally or fixedly mounted thereon, adjacent its lower end, a pinion or ratchet gear 428, and having its lower end suitably journaled at 430 in the bottom wall 432 of the cam. A manually operated ratchet lever 434 and an automatically operated ratchet lever 424, see Figures 8 and 9, are journaled on the shaft 426 between the ratchet gear 428 and the bottom wall 432.

Figure 38:
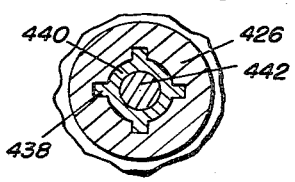
Figure 38 is a horizontal sectional detail view taken substantially upon the plane indicated by the section line 38—38 of Figure 6 and showing certain structural details of the compensating mechanism.

The internal bore of shaft 426 has a series of keyways 436, see Figure 38, which slidingly receive longitudinal keys 438 on the exterior surface of a tubular member 440 which is telescoped in the shaft, and has the above mentioned enlarged head 356 overlying the upper end of shaft 426 and constituting a support for the lower end of the sleeve 118. The aforementioned follower 352 is mounted upon the head 356 by the arm 358. The previously mentioned plunger 122 has a reduced extension 442 which is loosely received in the bore of the member 440.

As so far described, it will be evident that upon rotation of the ratchet gear, the follower will be rotated upon the cam surface 342, traveling upwards in a step-by-step motion and carrying with it the cross head 70 and the support post and tone arm.

Figure 10:
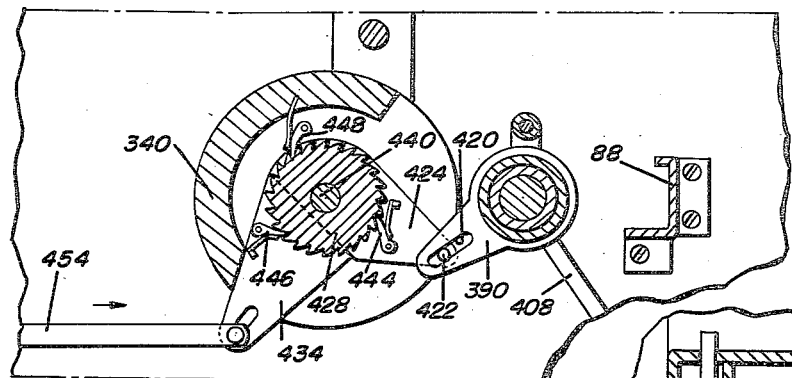
Figure 10 is a horizontal sectional detail view taken substantially upon the plane indicated by the section line 10—10 of Figure 6 and showing further details of the compensating mechanism.

The automatic and manual ratchet levers have spring pressed pawls 444 and 446 respectively which operatively engage the ratchet gear 428 and a pawl 448 is pivoted to the inner side of the compensating cam 340, as shown in Figures 10 and 21, to prevent reverse rotation of the tubular shaft 426. The manually operated ratchet lever 434 has a radial slot 450 in its outer end for the reception of a connecting pivot or pin 452 whereby an actuating member 454 in the form of a rod, bar or flexible cable, may be connected to said lever and extend to the exterior of the cabinet for manual operation. By this manually operated ratchet lever, the step-by-step upward travel of the tone arm may be effected to properly position the latter when automatic operation is not desired and records are played manually.

At this point it should be noted that the abrupt drop portion 343 of the compensating cam, which returns or lowers the support post after all the records of a stack have been automatically played, is provided with a cut-off switch 456 for the electric motor of the record player, actuated by passage of the follower extremity 354 thereover, as set forth in my prior copending application Serial No. 296,558.

*Ratchet drive for the compensating mechanism*

Surrounding the lower end of the support port 44 is a driving sleeve 360, see Figures 17, 32, and 39, which has an axial keyway 362 slidably receiving a key 364 on the lower end of the support post 44 to permit vertical axial sliding movement of the support post therein and cause the sleeve to oscillate as a unit with the support post. A pair of opposite longitudinal slots 366 opens upwardly from the bottom end of the sleeve, being adapted to register with the slot 116 of the support post. An additional longitudinal slot 367 extends from adjacent the top and adjacent the bottom for a purpose to be later disclosed.

A lateral retainer lug 368 extends from the upper end of the sleeve 360 for engagement with the underside of the journal bearing 89 through which the sleeve extends, as shown in Figures 6 and 8, to prevent vertical movement of the sleeve. A pair of oppositely positioned arcuate ribs 370 are positioned upon the exterior surface of the lower end of the sleeve.

As seen in Figure 6, a bushing 372 is threadedly secured in the cabinet bottom wall and constitutes a journal bearing for the spindle 374 formed as an axial projection on the bottom end of the stub axle 376, see Figures 35 and 6. An arm 378 extending horizontally from the bottom end of the stub axle carries a vertical tubular member or sleeve 380. A horizontal arm 382 on the bottom portion of the support post 44 carries a vertically depending pin 384 adapted to be telescopically received in the tubular member 380. The stub axle is axially alined with the support post whereby the telescoping connection of the elements 384 and 380 establishes a driving engagement therebetween, whereby oscillation of the support post 44 provides corresponding oscillation of the stub axle 376.

Extending laterally from the stub axle 376 are axially and circumferentially displaced pins 386 and 388 which constitutes part of an adjustable ratchet drive for the compensating mechanism.

As seen best in Figures 6, 8, 10, 17, 21, and 33, there is provided a crank arm or lever 390 secured integrally rigidly to the mid-portion of and extending laterally from a sleeve 392 which is rotatably and slidably journaled upon and is driven by the stub axle 376. The lower end of the sleeve is cut away or notched, as at 394, to provide vertical walls 396 and 398, see Figure 17 comprising actuated surfaces, whereby the pins 386 and 388 upon proper vertical adjustment of the sleeve 392, will selectively impart different oscillatory movements from the stub axle 376 to the crank arm 390.

Welded or otherwise rigidly mounted on the standard 88, see Figures 6, 8, and 17, is a horizontal bracket 400 having a depending bearing sleeve 402 whose inner and outer surfaces respectively journal and guide the stub axle 376 and the driven sleeve 392. A compression spring 404 encircles the sleeve 402 and yieldingly urges the driven sleeve 392 downwardly upon the stub axle. In order to adjustably lift the driven sleeve 392 upon the depending sleeve 402, there is provided a ring or yoke 406 which surrounds the sleeve 402 and engages the underside of the crank arm 390, the yoke being carried by a horizontal arm 408 extending from the lower end of the vertical adjusting rod 410, see Figure 5 and also Figures 1 and 3, having a finger grip knob 412 located above the cabinet top wall 12 adjacent the tone arm mounting.

The rod 410 extends through a guide and locking cylinder 414 mounted upon the top wall and which has a spring biased detent 416 selectively and releasably engageable in a pair of recesses 418 in the rod 410. The pair of recesses are spaced a distance equal to the axial spacing of the driving pins 386, 388, on the stub axle 376 and are so positioned that when the upper recess is engaged by the detent 416, the lower edge of the sleeve 392 will be lifted above the lowermost pin 386 whereby the notch walls 396 and 398 can contact, and be oscillatably driven by the upper pin 388; while the lower recess 418 is engaged by the detent, the sleeve 392 will be lowered so that both pins 386, 388, lie within the walls of the notch 394 and the rotationally advanced pin, the lower pin 386 will be effective to oscillate the sleeve 392. In view of the angular or circumferential displacement of the driving pins, it will be evident the constant amplitude of oscillation of the stub axle 376 will result in a different amplitude and time of oscillation and stroke being given to the lever arm 390.

At its outer end, the crank arm 390 has a radially extending slot 420 which slidingly receives a connecting pin 422 which is upstanding from a ratchet lever 424 which extends through a circumferentially extending slot 426 in the compensating cam 340 adjacent the bottom thereof, as shown in Figures 5, 6, and 8. As shown in Figure 8, the connecting pin 422 is of sufficient height to permit the aforesaid vertical adjustment of the sleeve 392 and its arm 390 while maintaining the driving connection during vertical adjustment of the sleeve 392 and its arm 390.

As the tone arm support post 44 oscillates each time a record is played, the connecting members 384 and 380 will cause the stub axle 376 to oscillate; and a selected one of the actuating pins 386, 388 thereon will actuate the arm 390 to thereby operate the ratchet lever 424. The manual adjusting mechanism 412, 410, 408, 406, will vertically adjust the arm 390 to vary the time and amplitude of its oscillation by the pins 386, 388. When a longer period and time of oscillation are provided by the manual adjustment, the ratchet lever imparts a greater amount of rotation to the shaft 426, as by rotating the latter two teeth of the ratchet gear 428. This moves the follower 352 two steps or recesses up the cam track 342 thereby lifting the tone arm through its support post a distance sufficient to compensate for the lowering of a record upon the turntable. This enables each oscillation of the tone arm to cause sufficient increase in its elevation to automatically play one side only (top or bottom) of each record, under the selective control mechanism set forth and claimed in my prior copending application Serial No. 314,987. When it is desired to play each side of the records, the manual adjustment will be set to give a shorter stroke to the ratchet lever 424, whereby the shaft 426 and its ratchet gear will be rotated, a single tooth at a time, thus requiring two actuations by the tone arm (each corresponding to the playing of one side of a record) to move the tone arm and support post upward of the compensated position for playing the next record.

It will be noted from Figures 17 and 30 that the lower end of the support post 44 has internal bosses or shoulders 460 having alined bores 462 which serve to journal the shaft 142 of the tilting control cam 140 whereby the latter is journaled in and reciprocates vertically with the support post. One end of the control shaft extends through one bore 462 and also through the slot 367 of the driving sleeve 360. The lobes of the cam 140 are given clearance and are received in the slots 366 of the sleeve 360 and a pair of diametrically disposed slots 369 in the support post 44.

Horizontal movement

The horizontal movement controls the horizontal swinging of the tone arm from its idle or rest position on the record player outside of the diameter of the records upon the spindle, to a position within the circumference of a record for playing the same and thereafter inside the sound track of the record after the record has been played. This movement includes the horizontal movement cam 78 and an operative connection between this cam and the tone arm support post 44 whereby the latter is oscillated about its vertical axis under the control of the cam to impart the desired horizontal swinging movements to the tone arm.

A horizontal swing lever 150, see in particular Figures 5-7, is rigidly secured to the support post 44, for oscillatory movement therewith, being disposed within the cabinet 10 and below the platform 50 and lying above the horizontal movement cam 78. This lever has a depending pin 152 which rests in and is operated by the cam track 180 upon the top surface of the cam 78. Thus, as the cam 78 is rotated, by any suitable means in properly timed relation to the actuation of the other instrumentalities of the record player, corresponding synchronized horizontal swinging movements will be imparted to the tone arm by the horizontal movement cam. It will be particularly noted that the operative connection between the tone arm, the horizontal swing lever and the horizontal movement cam will be unaltered despite vertical adjustments of the tone arm since the platform 50 which carries the cam 72 and 78 will move as a unit with the tone arm and the horizontal swing lever.

At the opposite end from its connection with the support post, the horizontal swing lever 150 has a lateral extension with an arcuately extending circumferentially toothed portion 154 which is adapted to be operatively engaged with a conventional form of reset mechanism whereby when the tone arm has completed its playing of the sound track of a record, and is disposed at the central portion of the record inside the sound track, the tone arm will be oscillated as the stylus or needle of the tone arm travels in the oscillating reset groove of the record. Since this reset mechanism is of conventional design and merely serves to energize the appropriate instrumentality of the record player to cause the tone arm to be lifted from the record, and move horizontally to its withdrawn position to one side of the record in anticipation for the next inward movement of the tone arm for playing the next record, further explanation regarding the same appears to be unnecessary. Since the horizontal swing lever, the record changer mechanism and their cooperative action are conventional, and in themselves form no part of the present invention, further illustration and description are deemed to be unnecessary and therefore are omitted from this application.

The horizontal movement of this invention, in accordance with the conventional horizontal movement of record players in general, also includes a limit lever 156 which is pivoted at 158 to the platform 50. This lever in the form illustrated in Figures 5, 7, 22, at one end portion, is provided with a flange 160 which is adapted as set forth hereinafter to be selectively positioned for engagement by the pin 152 of the horizontal swing lever, whereby the limit lever, by engagement of the pin against the flange will limit radial travel of the pin 152 in the cam groove 180 and consequently of the swing lever towards the center of the horizontal movement cam. This limiting of the limit lever upon the horizontal swing lever serves to position or index the stylus of the tone arm for proper setting down upon the sound track of a record for beginning the playing of that sound track.

In the conventional limit lever construction, there are two stop recesses, corresponding to the positioning or indexing of a tone arm for playing two sizes of records, as for example, 10 inch and 12 inch records. In accordance with this invention, however, the flange 160 permits a very large number of settings to properly index or position the tone arm stylus for selectively playing seven inch, ten inch, or twelve inch records, or any size of records.

Figure 23:
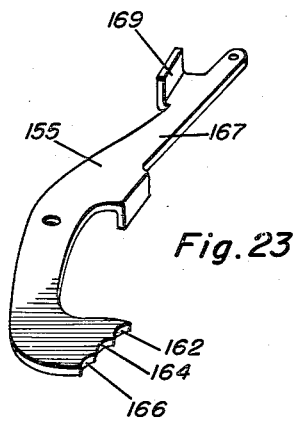
Figure 23 is a perspective view of a modified form of limit lever forming a part of the horizontal movement.

In the modified form of limit lever 155 illustrated in Figure 23, there are provided, in lieu of the flange 160 of the lever 156, a plurality of stop notches or recesses, one for each size of record for which it is desired to index the tone arm, as for example, the notches 162, 164, and 166 for seven inch, ten inch or twelve inch records respectively. The functioning of the modified limit lever 155 is identical with that of the limit lever 156, except that the former can index the tone arm for only those sizes of records for which the notches are provided, while the latter by its flange 160 can accommodate a varying number of sizes of records.

The other or actuated ends 167, 168, of the levers 155, 156, respectively, are modified from the conventional construction by the addition thereto of actuated flanges 169 and 170, by which the limit levers are adjustably actuated by a gauging or indexing mechanism set forth hereinafter.

It will be seen that although the horizontal swing lever employed in the horizontal movement of this invention is unaltered from conventional design, the limit lever is modified from conventional design by the addition of the abutments or stops at one end and by the provision of an actuated flange at the other end.

At its extremity, each form of the limit lever has attached thereto a tension spring 172 suitably secured to any desired form of bracket or lug 174 whereby the limit lever is urged into a position for causing a selected one of the notches or recesses to engage the pin on the horizontal swing lever; or to cause an appropriate portion of the flange 160 to perform its same function. Thus, either form of limit lever 155 or 156, serves to index the tone arm for playing a record.

Referring now especially to Figures 12 and 13, it will be seen that the tilting movement cam 72 and the horizontal movement cam 78 are provided with external ring gears 176 and 178 respectively, by means of which these cams are constantly in mesh with each other to maintain at all times, a fixed synchronized relation with each other.

Power can be applied to either gears 176 or 178 from the conventional source of power for the record player in any conventional manner. Since this arrangement forms no part of the invention claimed herein, illustration or further discussion of the same is considered superfluous.

Attention is now directed specifically to Figure 3 wherein it will be apparent that the horizontal movement cam 78 has a cam groove 180 in which travels the pin 152 of the horizontal swing lever. The radial movement of this pin toward and from the axis of rotation of the cam as the pin travels along the circumferentially extending cam groove 180 causes the horizontal swinging movement of the tone arm. The cam groove has a recessed portion 182 across which is positioned a leaf spring 184 has a bulging portion 186 extending further toward the center of the cam than does the conventional leaf spring. The improved leaf spring functions to resiliently urge the swing lever pin towards the center of the cam where it will engage the appropriate notch or recess of the limit lever 155 or the appropriate portion of the flange 160 of the limit lever 156.

*Gauging and indexing device*

In order that the record player in accordance with this invention may automatically play a stack of intermixed records of different sizes, there is provided a gauging and indexing device which gauges or determines the size of the next record to be played by the tone arm, and in response to and in accordance with the gauging operation adjusts the limit lever to properly position or index the tone arm for its set down upon the sound track of the record at the beginning of the same.

Figure 22:
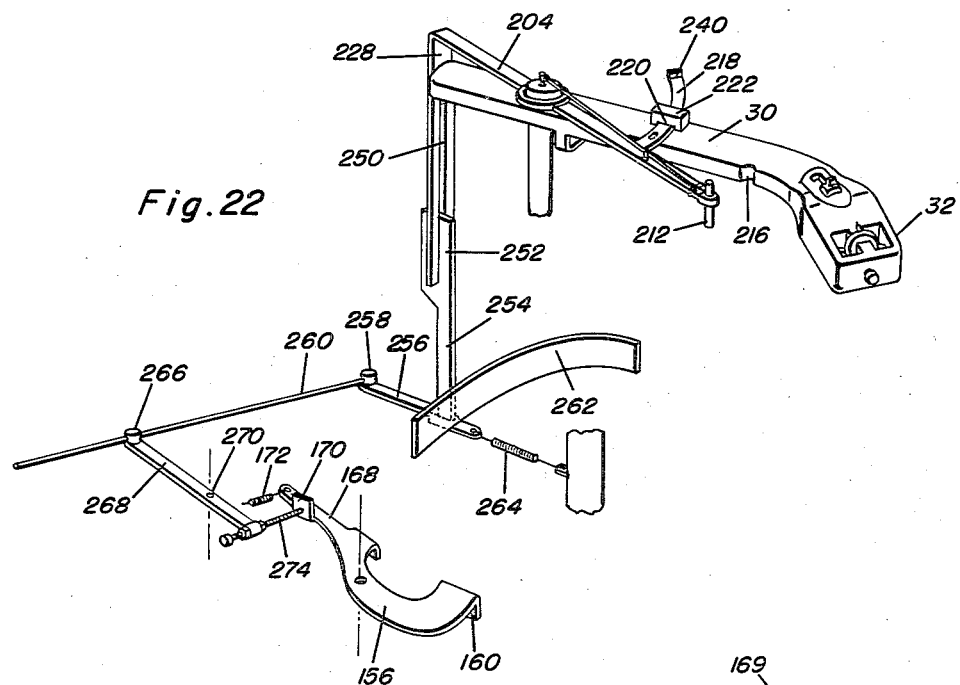
Figure 22 is a diagrammatic view in perspective of the gauging and indexing mechanism and the manner in which it is connected with the tone arm and the limit lever forming a part of the horizontal movement.

Referring now more particularly to Figures 14, 16, 22, it will be seen that the tone arm 30 upon its top wall 40, is provided with an upstanding drum or cylindrical member 200, which upon opposite sides is provided with peripheral grooves 202. A gauging blade in the form of an elongated, generally flat strip 204 is provided in its intermediate portion, as shown more clearly in Figure 16, with an annulus 206 which is rotatably received upon the cylindrical member 200 and is provided with diametrically disposed pins 208 which extend into the annulus and are received in the grooves 202, previously mentioned. These pins may be screw-threaded into the annulus for ready application to or removal therefrom. By means of these pins, the annulus and the gauging blade are secured to the cylindrical member 200 for horizontal swinging movement thereon, the gauging blade resting and sliding upon the top wall 40.

At what may be termed its front or gauging end, the gauging blade 204 is provided with a vertically disposed gauging element, which may conveniently take the form of a pin or roller 212 while at its rear end the blade is provided with a downwardly extending arm 228. The gauging pin extends above and below the tone arm and is automatically vertically reciprocated and adjusted for an operation and in a manner to be subsequently set forth, and the side wall 42 of the tone arm which is adjacent the turntable is provided with a cylindrical recess 216 adapted to receive this pin when the gauging blade is moved into a collapsed position against the tone arm at the completion of the gauging operation, as in Figure 3.

Extending laterally from the gauging blade 204 between its annulus 206 and the gauging pin 212 and from what may be termed the rear or non-gauging side of the blade is an arcuately extending member 218 constituting a guide. As shown in Figure 22, the guide 218 extends through a transverse guide slot 220 provided in the lower end of a bracket 222 which is secured to and rises from the top wall 40 of the tone arm.

As will be apparent by reference to Figure 4, the bracket 222 is provided with a chamber 230 in its upper portion which opens into the slot 220. This chamber receives a compression spring 232 which urges a detent ball 234 downwardly against the arcuate guide 218. As an appropriate position along its length, the arcuate guide is provided with appropriately spaced slots or apertures 236 and 226 which are each adapted to receive the detent ball 230 to thereby resiliently and yieldably retain the guide in a predetermined position, these being the collapsed or reset position of the device shown in Figure 3, or the extended or reset position of the gauging blade when the latter is ready to begin its gauging operation, as in Figures 1, 14, and 22.

At its extreme outward end, the arcuate guide 218 is provided with a flange 240 which is adapted for actuation by a reset abutment.

Rising from the top wall 12 of the cabinet is a standard 244 having a screw 246 threaded therethrough. The screw is threadedly engaged with the standard, and is rotatably but non-threadedly engaged with a channel-shaped member 248 constituting an adjustable abutment. This abutment is positioned for engagement by the flange 240 of the arcuate guide 218, and is so positioned that when the tone arm moves or is swung horizontally away from the turntable and records and toward the idle or rest position of the tone arm, the flange will strike the abutment whereby the final movement of the tone arm away from the turntable will result in pushing the arcuate guide from the collapsed position of Figure 3 outwardly from the tone arm into the gauging position of Figure 1. During this movement of the guide, the slot 226 of the gauge blade guide 218 is disengaged from the detent ball, and the detent aperture 236 of the gauge blade guide is moved into engagement with the detent ball. The gauging blade is thus resiliently secured in its reset position in readiness for the next gauging operation.

Referring more especially now to Figures 1, 2, 6, and 14, it will be observed that the top wall 12 of the cabinet has an arcuate slot 238 therethrough to permit passage of the gauging blade arm 228 during arcuate movement of the latter in response to movement of the tone arm. The gauging blade arm 228 is adapted for operative connection with the tone arm limit lever previously mentioned in a manner to be now described.

Attention is now directed generally to Figure 2 and more specifically to Figures 14, 22, 36, and 37 for a more complete understanding of the gauge pin 212 and its mounting and operating mechanism. The gauge blade 204 has a longitudinal slot 464 at its forward end and a vertical bore 466 intersects this slot. The gauge pin 212 is slidably received in the bore 466, has an axial chamber or bore 468 opening from one end, which chamber is closed by threaded plug 470.

A longitudinal slot 472 is provided in the pin 212 communicating with the chamber 468 and a retainer pin 474, carried by and extending inwardly from the end of blade 204, is disposed through the slot 472 and into the chamber 468 to retain the pin in its vertical bore 466 and prevent rotation thereof. The pin also constitutes a seat for a pair of compression springs 476 and 478 which are disposed in the chamber 468 and engage the bottom of the chamber 468 and the closure plug 470 respectively. The springs yielding retain the pin in its intermediate vertical position, which is the rest or inoperative position of the pin, and tend to yieldingly return the pin to the position when it is displaced therefrom.

Diametrically opposite the slot 472, the gauging pin has a latching recess 480. A latch lever 482 pivotally mounted in the slot 464 by a pivot pin 484, has a ball detent 486, yieldingly biased by a spring 488 housed in a chamber 490, which ball detent is adapted to seat in the detent recess 480 of the gauge pin.

A latch actuating lever 492 is fulcrumed at 494 intermediate its ends to a fulcrum support or bracket 496 mounted upon the gauge blade 204 and has a downturned forward end 498 extending into the slot 464 and pivoted at 500 to the latch lever 482. At its other end, the actuating lever 492 has a pivotal connection 502, see Figure 6, with a connector member 504 which extends through an aperture 506 in the cylindrical member 200 on the tone arm and rests upon the tilting pin 102, upon the horizontal leg 108 at the axis of the vertical leg 104.

The operation of the latching mechanism and its effect upon the functioning of the gauging pin 212 are as follows.

The gauging pin's length is less than the distance between the adjacent surfaces of records 18 and 34, see Figure 2, resting upon the supporting and driving assembly 26 and the turntable 16, so that when the gauging pin 212 is in its intermediate vertical position, as shown in full lines in Figure 36, and the tone arm is in its idle or horizontal position, the tone arm and pin can freely swing inward towards the turntable spindle without the pin contacting either record.

When the record player prepares to play a record, the control cam 140, either manually or automatically operated, as set forth hereinbefore, vertically elevates or lowers the tilting rod 100 to move the tilting rod actuating pin 112 from its resting position at the midpoint of the transfer passage 284 of the tilting cam 72, to registration with the cam grooves 278 and 282. This initial movement of the tilting rod necessary to position pin 112 in the proper cam groove, produces an initial, but substantially negligible tilting movement of the tone arm, but does tilt the latch actuating lever 492 by virtue of its connection at 502, 504 with the tilting rod pin 102.

The tilting of the latch actuating lever 492 in turn causes a vertical pivoting of the latch lever 482 from its rest position, shown in full lines in Figure 36 to a tilted position in either direction, one of which is shown in dotted lines in Figure 36. When the latch lever tilts, the yielding engagement of the detent member 486, whether ball or plunger, with the recess 480 of the gauging pin 212 is sufficient to vertically raise or lower the latter in its bore 466. Thus, as the tilting rod is raised in the initial position of its movement in preparation for upward tilting of the tone arm to the position B of Figures 18 and 19, the gauging pin 212 is elevated so that it will engage a record 18 when the tone arm is horizontally swung inwards towards the spindle. Conversely, when the tilting rod is lowered in preparation for downward tilting of the tone arm to the position C of Figure 19 and Figure 20, the gauging pin is likewise lowered so that it will engage a record 34 when the tone arm is moved horizontally inwards.

The resilient movement of the detent member 486 is sufficient to maintain a driving contact in the recess 480 during their limited tilting of the latch lever in the initial portion of the tilting of the tone arm by the tilting rod, whereby the gauging pin will be shifted to its proper gauging position, either up or down, against the bias of its return springs 476 and 478.

However, upon the completion of the gauging and indexing operation, as set forth hereinafter, when the tone arm is indexed and ready to set down upon the sound track, the tilting cam is rotated and the appropriate tilting groove 278 or 282 now completes the final vertical travel, either up or down, of the tilting rod. This further travel of the latter, through the levers 492 and 482, imparts a still further arcuate travel to the detent member 486 withdrawing the latter from the recess 480 and permitting the return spring to restore the gauging pin to its idle position of Figure 36, permitting the tone arm to complete its tilting to the final stylus set-down position without interference from the gauging pin.

Although the pin 212 illustrated may be used, it is also possible to mount rollers or sleeves thereon at its opposite ends, as by anti-friction bearings, if desired.

A connecting means is provided for operatively connecting the rearwardly extending end of the gauging blade and its arm 228 with the limit lever 156. The limit lever has oscillating movement in a horizontal plane, while the arm 228 has both a horizontal oscillating movement in conjunction with the tone arm and also a tilting movement therewith. The connecting means is therefore devised to permit these relative motions between the arm 228 and the limit lever 156.

The lower end of the arm 228 is vertically slotted at 250, see Figures 5 and 22, and slidably received therein is the laterally enlarged upper end 252 of a vertical arm 254. The latter has a horizontally extending member 256 which is provided with a pivotal connection 258 by which it is connected to a rod 260.

Depending from the platform 50 is an arcuate guide or abutment surface 262 which is concentric with the axis of rotation of the tone arm support post 44. A vertical edge of the vertical arm 254 is adapted to ride upon the convex surface of this abutment surface, being yieldingly retained thereagainst as by a tension spring 264 secured in any suitable manner and positioned to the horizontal member 256 and any convenient portion of the record player. The horizontal portion 256 is positioned between suitable guiding members 265, see Figure 6, to thus maintain the element 254, 256, in proper position. As so far described, it will be apparent that upon horizontal swinging movement of the tone arm, the arm 228 and the member 254 will be moved arcuately therewith about the vertical axis of the tone arm support post. This movement in turn will cause longitudinal movement of the rod 260 which slidably extends through an apertured swivelling connection 266, at one end of a lever 268 journaled on a vertical pivot 270. An adjustable collar 272 may be mounted upon the rod 260 to adjust the operative relationship of the same with the lever 268.

At the other end of the lever 268, from its pivot pin 270, the same is provided with an adjusting screw 274 which extends through a convenient opening 276 in the bracket 174 and into abuting engagement with the actuated flange 170 upon the limit lever 156; or the flange 169 of the modified limit lever 155, if the latter is used. It will thus be apparent as the tone arm swings horizontally, through the above described connecting means, a corresponding movement is imparted to the limit lever 156 or 155 and such movement of the limit lever will appropriately position the stop flange 160 on the lever 156 or one of the recesses or notches on the lever 155 into operative relation with the pin 152 on the swing lever 150.

The operating of the adjusting mechanism of the index device is as follows: Assume that a stack of records 22 has been placed upon the spindle in the position of Figure 2 and the record player has been started. The lowermost record 24 is lowered from the stack in the usual manner, being placed upon the supporting and driving assembly 26, as at 18, with the pressure arm assembly 28 being then applied thereto. The gauging pin is now elevated by the tilting rod 100 when the latter is raised by the control cam 140. The tone arm, in the position shown in Figure 1 and with the gauging device in the reset position shown in that figure now moves from its rest position inward towards the record until the elevated gauge pin 212 engages the rim of the record shown in the position 18 as mounted upon the supporting and driving assembly 26. As this point is reached, the actual gauging operation begins.

As the tone arm and the gauging blade continue to move inward, the pressure of the gauging pin 212 is against the record 18 causes the gauge blade and its guide 218 to move from the position of Figure 1, the gauge blade guide being forcibly released from the resilient detent means 234, 226 until the detent ball 234 is seated in the detent opening 236. At this time, the blade is in completely collapsed position with the gauge pin 212 being now received in the recess 216 in the tone arm, and the stylus or needle of the tone arm being now disposed in properly indexed position above the beginning of the sound track groove on the top side of the record 18. During this portion of the operation, the gauge mechanism functions as set forth above.

As the gauge moves inwardly or collapses upon the tone arm, the gauge blade arm 228 with its connecting means has appropriately shifted the limit lever to position the proper portion of the flange 160 of the limit lever 156 or the recesses or notches 162, 164, or 166, of the limit lever 155, in position to engage the pin 152 of the horizontal swing lever and thus limit inward travel of the tone arm to the proper indexed position for playing that particular record. It will be evident that the extent of the inward travel of the tone arm, from its rest position, shown in Figure 1, to the completion of the gauging operation, shown in Figure 3, is proportionate to the size of the record contacted by the gauge blade pin and consequently the adjustment of the limit lever will also be proportionate to the record size. Consequently, the stop surfaces of the limit lever will be appropriately positioned so that they will be engaged by the swing lever 152, thus halting the swing lever and the tone arm in proper position for the set down of the stylus upon the sound groove of that particular record. After the record has been gauged and played in the above described manner, and the tone arm withdrawn, the pressure assembly is lifted, the record is lifted, the supporting and driving assembly 26 is withdrawn and the record is lowered to the turntable into the position shown at 34. The assembly 26 is then replaced, a new record lowered thereon, the pressure assembly 28 then applied, the tone arm is then reintroduced repeating the gauging operation on the record which is now indicated at 34, and then tilted downward to play the upper sound groove of the record upon the turntable.

It will thus be apparent that each record is gauged and the tone arm indexed for that record before the tone arm is tilted into playing position and before the record is played.

It will be observed that the above described construction and operation of the gauging device enables the gauging operation to be effectively performed each time the tone arm moves in from its rest position; and is not effected by the size of the records 18 or 34, since the initial part of the tone arm tilting movement is effective to cause the gauging pin 212 to be extended into operative gauging position towards the record, either 18 or 34, which it is desired to gauge and play.

*Modified gauging device of Figures 25–28*

While in general the above described form of gauging device disclosed in Figures 14–16, 22, 36 and 37, is considered to be superior in view of its greater range of use and adaptability to various construction of record players, the simpler and less expensive modified embodiment of Figures 25–28 may be deemed preferable for certain particular structural arrangements in a record player.

The modified arrangement is shown in Figures 25–28 as being applied to the same construction of tone arm 30 and needle change assembly 32 previously described in detail and has the tone arm mounted upon the support post 44 in the same manner and for the same functions. There is also provided the same tilting rod tilting pin 108 engaging the tone arm bracket 110 for effecting tilting of the tone arm in the manner previously set forth.

It will be further noted that the cabinet top wall 12 likewise has the support post bushing 92 and the arcuate slot 238 to receive the connection between the modified gauging device on the tone arm and the indexing device, previously described, which is mounted within the cabinet and associated with the horizontal movement to adjust the limit lever for indexing the tone arm through the pin 152 upon its horizontal swing lever.

A support bracket 508 extends laterally from a side wall of the tone arm upon its rear side which is the side remote from the turntable, and carries a vertically disposed fulcrum pin 510 by which a connecting lever 512 is pivoted adjacent one end of the tone arm. The lever 512 is thus mounted for horizontal swinging movement towards and from the tone arm, its longer leg being provided at its rear end with a downwardly extending member 514 which may be identical with the element 228 previously described, is connected to the member 252 in the same manner and performs the same functions.

The side walls of the tone arm are provided with guide slots 516 and the connecting lever 512 has an arcuate guide blade 518 slidably and guidably received therein, thereby restraining the lever 512 against vertical movement relative to the tone arm.

Upon the rear side wall of the tone arm, adjacent the enlarged head which houses and forms a part of the needle changer assembly 32, there is mounted a second lateral fulcrum bracket 520 carrying a vertical fulcrum pin 522 by which the mid-portion of an actuating lever 524 is journaled for horizontal swinging movement. The adjacent ends of the levers 512 and 524 are interconnected by means of an upstanding vertical pin 526 on the end of the lever 512 which is loosely but operatively received in the forked or slotted portion 528 of the lever 524.

Referring now to Figure 28, it will be seen that a rod or sleeve 530 is journaled in a horizontal bore 532 extending into the forward side of the needle changer assembly 32, being releasably, rotatably and slidably secured by a set screw 534 in the top of the tone arm which is seated in a circumferentially and axially extending spiral groove 536 in the rod 530. At its outer end the rod has a U-shaped extension 538 which may be either integral therewith or rigidly mounted thereon and which includes parallel plates 540, 542, having oppositely disposed screw threaded axles 544 and 546 integrally or rigidly mounted thereon. A pair of internally threaded sleeves 548 and 550, preferably of a resilient material such as rubber or plastic, are threaded upon the axles as gauging elements. It will be observed that the gauge sleeve 548 is longer than the sleeve 550 in order to enable the same to gauge the record 18.

The extremity of the rod 530 which is disposed within the tone arm head, has an open axial bore or chamber 552 in which is rotatably journaled the inner end of a shaft 554 which extends through the opposite side wall of the head, being journaled in a bearing bore 556 therein. A retaining pin or set screw 558 extends through the wall of the rod 530 into the bore 552 and engages in a circumferential groove or channel 560 to thereby prevent relative axial movement but permit relative rotation between the rod 530 and shaft 554.

At its outer end, the shaft 554 is bifurcated or slotted at 562 and carries a pivot pin 564 which is received in a slot 566 provided in the end of the actuating lever 524 which is received in the slot 562 whereby the lever is operatively connected to the shaft 554, rod 530 and gauge elements 548 and 550.

Adjacent the U-shaped member 538, the rod 530 has a crank arm 568 to which is pivotally connected the angularly disposed end 570 of a connecting link or rod 572. The latter is positioned along the forward side wall of the tone arm and at its other extremity is angulated at 574 for pivotal engagement with the upper end of a lever 576. At its lower end, the lever 576 is pivoted at 578 to a laterally extending mounting bracket secured fixedly and in proper position to the tone arm support post 44, below the tone arm, by a clamp 582. A set screw or the like 584 is employed to detachably and adjustably secure the clamp upon the support post. An elongated slot 586 is disposed in the latches 576 intermediate the ends of the latter, as shown in Figure 25, and a lateral pin 588.

It should be especially observed that the pivotal connections 574 and 578 of the latch are disposed on opposite sides of the horizontal axis of the pivot pin 590 about which the tone arm tilts and the pin 588 is also displaced from the pin 590. The pivot pin 588 may be identical with the trunnions 46 described and illustrated hereinbefore. It will also be now understood that the lever 576 will now move vertically and will move horizontally with the tone arm because of its fixed but adjustable mounting upon the tone arm support post. However, when the tone arm tilts, in order to set down on a sound track, the relative location of the pins and pivots will result in a pivotal movement of the lever 576.

As will be apparent from Figure 25, the downward clockwise tilting of the tone arm about its pivot 590 will cause a corresponding clockwise arcuate or oscillatory movement of the pin 588 about pivot 590. Since the pin 588 is slidable in the slot 586, it will move towards the left, imparting a counterclockwise movement to the lever 576 about its pivot 578. This in turn, through the connecting rod 572 and crank 568 will rotate the rod 530 moving the gauge elements 548 and 550 from the vertical gauging position of Figure 25 into a horizontal non-gauging position thereby retracting the elements within the top and bottom limits of the tone arm to permit the stylus to set down on a sound track without interference. An upward tilting of the tone arm will actuate the parts in a reverse direction, but the rod 530 will again rotate through substantially 90°, but in the opposite direction, to retract the gauge elements. The above described retracting actions, however, do not occur until the tone arm has been indexed and is tilting for its set down on the sound track.

In the indexing operation, the tone arm approaches the record 18 or 34 which it is desired to gauge. As the gauge elements in the vertical gauging position of Figures 25, 27, 28, which is the position they assume when the tone arm is untilted, approach and contact the rim of a record, the further inward swing of the tone arm pushes the rod 530 towards the right in Figure 28, into the tone arm head. This axial movement, due to the engagement of the set screw 534 in the spiral groove 536, rotates the rod and through the pin 558 and groove 560 moves the shaft 554 axially towards the right.

The axial outward travel of the shaft 554 oscillates the lever 524 which in turn swings the lever 512 to operate the limit lever 155 or 156 in the manner and by the structure described in detail in connection with the preceding embodiment. The lever system 524, 512 gives an amplified movement to the member 514.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In an automatic phonograph record player, a tone arm having needles extending upwardly and downwardly therefrom, a support post, means mounting said tone arm upon said support post for tilting upwardly and downwardly in a vertical plane, a tilting rod vertically reciprocable in said tone post and operatively connected at its upper end to said tone arm for tilting the latter, an actuating pin on said tilting rod, a tilting cam having vertically spaced upward and downward tilting grooves, a control cam carried by and rotatably journaled in said support post and operatively associated with said tilting rod for selectively vertically positioning said actuating pin in one of said tilting grooves.

2. The combination of claim 1, wherein said support post has a slot therein, said actuating pin extending through said slot into operative engagement with said tilting cam.

3. The combination of claim 1, wherein said support post has a slot therein, said actuating pin extending through said slot into operative engagement with said tilting cam, a stationary guide sleeve interposed between said tilting rod and said support post.

4. The combination of claim 1 including a stationary guide sleeve interposed between said tilting rod and said support post.

5. The combination of claim 1 wherein said support post has a slot therein, said actuating pin extending through said slot into operative engagement with said tilting cam, a stationary guide sleeve interposed between said tilting rod and said support post, said guide sleeve having a vertical slot for guidingly receiving said actuating pin.

6. The combination of claim 1 including a stationary guide sleeve interposed between said tilting rod and said support post, said guide sleeve having a vertical slot for guidingly receiving said actuating pin.

7. The combination of claim 1 including, automatic operating means connected to said control cam for operating the latter in timed relation.

8. The combination of claim 1 including, automatic operating means connected to said control cam for operating the latter in timed relation, manually operated clutch means rendering said automatic operating means inoperative, manually operated means for actuating said control cam.

9. In an automatic phonograph record player, a tone arm having needles extending upwardly and downwardly therefrom, a support post, means mounting said tone arm upon said support post for tilting upwardly and downwardly in a vertical plane, a tilting rod vertically reciprocable in said support post and operatively connected at its upper end to said tone arm for tilting the latter, an actuating pin on said tilting rod, a tilting cam having vertically spaced upward and downward tilting grooves, control means carried by and disposed within said support post for selectively positioning said actuating pin in one of said tilting grooves, a platform upon which said tone arm and tilting cam are mounted, means for vertically adjusting said platform.

10. The combination of claim 9 wherein said last mentioned means includes a vertically extensible member operatively connected to said platform for lifting the same, a sliding wedge operatively associated with said extensible member for elongating the same.

11. The combination of claim 9 wherein said last mentioned means includes a vertically adjustable support for said platform, means for adjusting said support, operating means actuatable each time said tone arm moves horizontally upon playing a record for operating said adjusting means.

12. The combination of claim 9 wherein said last mentioned means includes a vertically adjustable support for said platform, means for adjusting said support, operating means actuatable each time said tone arm moves horizontally upon playing a record for operating said adjusting means, said vertically adjustable support including a longitudinally extensible element, a sliding wedge operatively associated with said element, means for operating said wedge to adjust the length of said element.

13. In an automatic phonograph record player, a tone arm having needles extending upwardly and downwardly therefrom, a support post, means mounting said tone arm upon said support post for tilting upwardly and downwardly in a vertical plane, a tilting rod vertically reciprocable in said support post and operatively connected to its upper end to said tone arm for tilting the latter, an actuating pin on said tilting rod, a tilting cam having vertically spaced upward and downward tilting grooves, control means carried by and disposed within said support post for selectively positioning said actuating pin in one of said tilting grooves, a platform upon which said tone arm and tilting cam are mounted, means for vertically adjusting said platform, said last mentioned means including a vertically adjustable support for said platform, means for adjusting said support, operating means actuatable each time said tone arm moves horizontally upon playing a record for operating said adjusting means, said operating means including a ratchet for imparting step-by-step movement to said support adjusting means.

14. In an automatic phonograph record player, a tone arm having needles extending upwardly and downwardly therefrom, a support post, means mounting said tone arm upon said support post for tilting upwardly and downwardly in a vertical plane, a tilting rod vertically reciprocable in said support post and operatively connected to its upper end to said tone arm for tilting the latter, an actuating pin on said tilting rod, a tilting cam having vertically spaced upward and downward tilting grooves, control means carried by and disposed within said support post for selectively positioning said actuating pin in one of said tilting grooves, a platform upon which said tone arm and tilting cam are mounted, means for vertically adjusting said platform, said last mentioned means including a vertically adjustable support for said platform, means for adjusting said support, operating means actuatable each time said tone arm moves horizontally upon playing a record for operating said adjusting means, said operating means including a ratchet for imparting step-by-step movement to said support adjusting means, means for regulating the amplitude of the step-by-step movement imparted by said ratchet.

15. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, said tilting cam has a pair of grooves for selective upward and downward tilting of the tone arm, control means operatively associating said connecting means with one of said grooves.

16. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, said connecting means comprises a member housed and slidable within said post and operatively connected to said tone arm and to said tilting cam.

17. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, compensating mechanism operatively connected to said platform moving means, driving means connected to said compensating means and to said support post for actuating the latter step-by-step upon oscillation of the post, said driving means including a stub axle alined with said post, a telescoping driving connection between said post and stub axle and to one side thereof.

18. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, said tilting cam having a pair of grooves for selective upward and downward tilting of said tone arm, control means operatively associating said connecting means with one of said grooves, said connecting means comprises a member housed and slidable within said post and operatively connected to said tone arm and to said tilting cam.

19. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, said tilting cam having a pair of grooves for selective upward and downward tilting of said tone arm, control means operatively associating said connecting means with one of said grooves, said connecting means comprises a member housed and slidable within said post and operatively connected to said tone arm and to said tilting cam, said control means including a cam journaled in said post and operatively connected to said member for vertically moving the latter.

20. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, compensating mechanism operatively connected to said platform moving means, driving means connected to said compensating means and to said support post for actuating the latter step-by-step upon oscillation of the post, said driving means including a stub axle alined with said post, a telescoping driving connection between said post and stub axle and to one side thereof, said tilting cam having a pair of grooves for selective upward and downward tilting of the tone arm, control means operatively associating said connecting means with one of said grooves.

21. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, compensating mechanism operatively connected to said platform moving means, driving means connected to said compensating means and to said support post for actuating the latter step-by-step upon oscillation of the post, said driving means including a stub axle alined with said post, a telescoping driving connection between said post and stub axle and to one side thereof, said tilting cam having a pair of grooves for selective upward and downward tilting of the tone arm, control means operatively associating said connecting means with one of said grooves, said connecting means comprising a member housed and slidable within said post and operatively connected to said tone arm and to said tilting cam.

22. In an automatic phonograph record player, a platform, means including a stationary cam and a cam follower on said platform for moving said platform vertically, a support post journaled on said platform for oscillation about a vertical axis, a tone arm pivoted on said post for tilting in a vertical plane and being horizontally swingable with said post, tilting and horizontal movement cams on said platform, said horizontal movement cam being operatively connected to said post for imparting oscillation thereto in properly timed relation, means connecting said tilting cam to said tone arm for effecting tilting thereof in properly timed relation, compensating mechanism operatively connected to said platform moving means, driving means connected to said compensating means and to said support post for actuating the latter step-by-step upon oscillation of the post, said driving means including a stub axle alined with said post, a telescoping driving connection between said post and stub axle and to one side thereof, said tilting cam having a pair of grooves for selective upward and downward tilting of the tone arm, control means operatively associating said connecting means with one of said grooves, said connecting means comprising a member housed and slidable within said post and operatively connected to said tone arm and to said tilting cam, said control means including a cam journaled in said post and operatively connected to said member for vertically moving the latter.

References Cited in the file of this patent

UNITED STATES PATENTS

| | | |
|---|---|---|
| 1,700,397 | Birket | Jan. 29, 1929 |
| 2,512,121 | Thevenaz | June 20, 1950 |
| 2,550,794 | Fisher | May 1, 1951 |
| 2,555,895 | Lynch | June 5, 1951 |
| 2,586,422 | Fisher | Feb. 19, 1952 |
| 2,601,986 | James et al. | July 1, 1952 |
| 2,610,062 | Bratton | Sept. 9, 1952 |
| 2,661,217 | Bidinger | Dec. 1, 1953 |